(12) United States Patent
Park et al.

(10) Patent No.: US 9,836,182 B2
(45) Date of Patent: Dec. 5, 2017

(54) MOBILE TERMINAL AND CONTROL METHOD FOR THE MOBILE TERMINAL

(71) Applicant: LG ELECTRONICS INC., Seoul (KR)

(72) Inventors: Mihyun Park, Seoul (KR); Dongsu Han, Seoul (KR); Woohyoung Shin, Seoul (KR); Seonghyok Kim, Seoul (KR); Sungho Woo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 388 days.

(21) Appl. No.: 14/510,964

(22) Filed: Oct. 9, 2014

(65) Prior Publication Data

US 2015/0350414 A1    Dec. 3, 2015

(30) Foreign Application Priority Data

May 27, 2014    (KR) .......................... 10-2014-0063930

(51) Int. Cl.
| | |
|---|---|
| *G06F 3/0481* | (2013.01) |
| *G06F 3/0486* | (2013.01) |
| *G06F 3/0488* | (2013.01) |
| *H04M 1/725* | (2006.01) |
| *H04M 1/57* | (2006.01) |

(52) U.S. Cl.
CPC ........ *G06F 3/04817* (2013.01); *G06F 3/0486* (2013.01); *G06F 3/0488* (2013.01); *H04M 1/72519* (2013.01); *H04M 1/72583* (2013.01); *H04M 1/575* (2013.01); *H04M 2250/60* (2013.01)

(58) Field of Classification Search
CPC ............... G06F 2201/86; G06F 3/0481; G06F 11/3065; G06F 11/3079; G06F 11/324; G06F 11/327; G06F 3/0486; G06F 3/04888; G06F 3/0491; G06F 9/542; H04M 1/725; H04L 67/26; H04L 51/32; H04L 67/22; H04L 51/24; H04L 12/1895; H04L 67/24; H04L 41/0604; H04W 4/12; H04W 4/14
See application file for complete search history.

(56) References Cited

U.S. PATENT DOCUMENTS

| | | |
|---|---|---|
| 7,996,045 B1 | 8/2011 | Bauer et al. |
| 2005/0120306 A1 | 6/2005 | Klassen et al. |
| 2005/0188320 A1 | 8/2005 | Bocking |

(Continued)

FOREIGN PATENT DOCUMENTS

| | | |
|---|---|---|
| EP | 1621983 A2 | 2/2006 |
| EP | 2387215 A1 | 11/2011 |
| WO | WO 2005/055034 A1 | 6/2005 |

*Primary Examiner* — Tadeese Hailu
(74) *Attorney, Agent, or Firm* — Birch, Stewart, Kolasch & Birch, LLP

(57) ABSTRACT

A mobile terminal including a wireless communication unit configured to perform wireless communication; a display unit configured to display an icon corresponding to an application; and a controller configured to display a first graphic object on the display unit along with the icon indicating first information about an event that has occurred with respect to the application, and display a second graphic object on the display unit including second information about the event that has occurred in which the second information includes more detailed information than the first information.

18 Claims, 22 Drawing Sheets

(56) References Cited

U.S. PATENT DOCUMENTS

| | | | |
|---|---|---|---|
| 2008/0125178 A1* | 5/2008 | Park | H04M 1/57 455/564 |
| 2009/0222748 A1* | 9/2009 | Lejeune | G06F 1/1616 715/764 |
| 2009/0249247 A1* | 10/2009 | Tseng | H04M 1/72552 715/808 |
| 2010/0058231 A1* | 3/2010 | Duarte | G06F 3/0481 715/800 |
| 2011/0066976 A1* | 3/2011 | Hwang | G06F 3/04883 715/810 |
| 2011/0219312 A1* | 9/2011 | Kim | G06F 3/01 715/739 |
| 2012/0052918 A1 | 3/2012 | Yang | |
| 2013/0002725 A1* | 1/2013 | Kim | G06F 9/4445 345/684 |
| 2013/0076661 A1* | 3/2013 | Reeves | G06F 3/1438 345/173 |
| 2013/0102286 A1* | 4/2013 | Toksvig | H04W 4/206 455/412.2 |
| 2013/0145295 A1* | 6/2013 | Bocking | G06F 3/017 715/764 |
| 2014/0026098 A1* | 1/2014 | Gilman | G06F 3/0482 715/810 |
| 2014/0031085 A1 | 1/2014 | Kim | |
| 2014/0040769 A1* | 2/2014 | Lazaridis | G06F 3/0483 715/752 |
| 2014/0080465 A1* | 3/2014 | Cho | H04W 4/12 455/415 |
| 2014/0179377 A1* | 6/2014 | Song | H04L 67/306 455/566 |
| 2014/0215494 A1* | 7/2014 | Kim | G06Q 10/109 719/318 |
| 2014/0229898 A1* | 8/2014 | Terwedo | G06F 3/04817 715/835 |
| 2014/0245202 A1* | 8/2014 | Yoon | G06F 3/0482 715/765 |
| 2014/0283142 A1* | 9/2014 | Shepherd | G06F 3/0482 726/30 |
| 2014/0351744 A1* | 11/2014 | Jeon | G06F 3/0482 715/781 |
| 2015/0339028 A1* | 11/2015 | Chen | G06F 3/04883 715/863 |

* cited by examiner

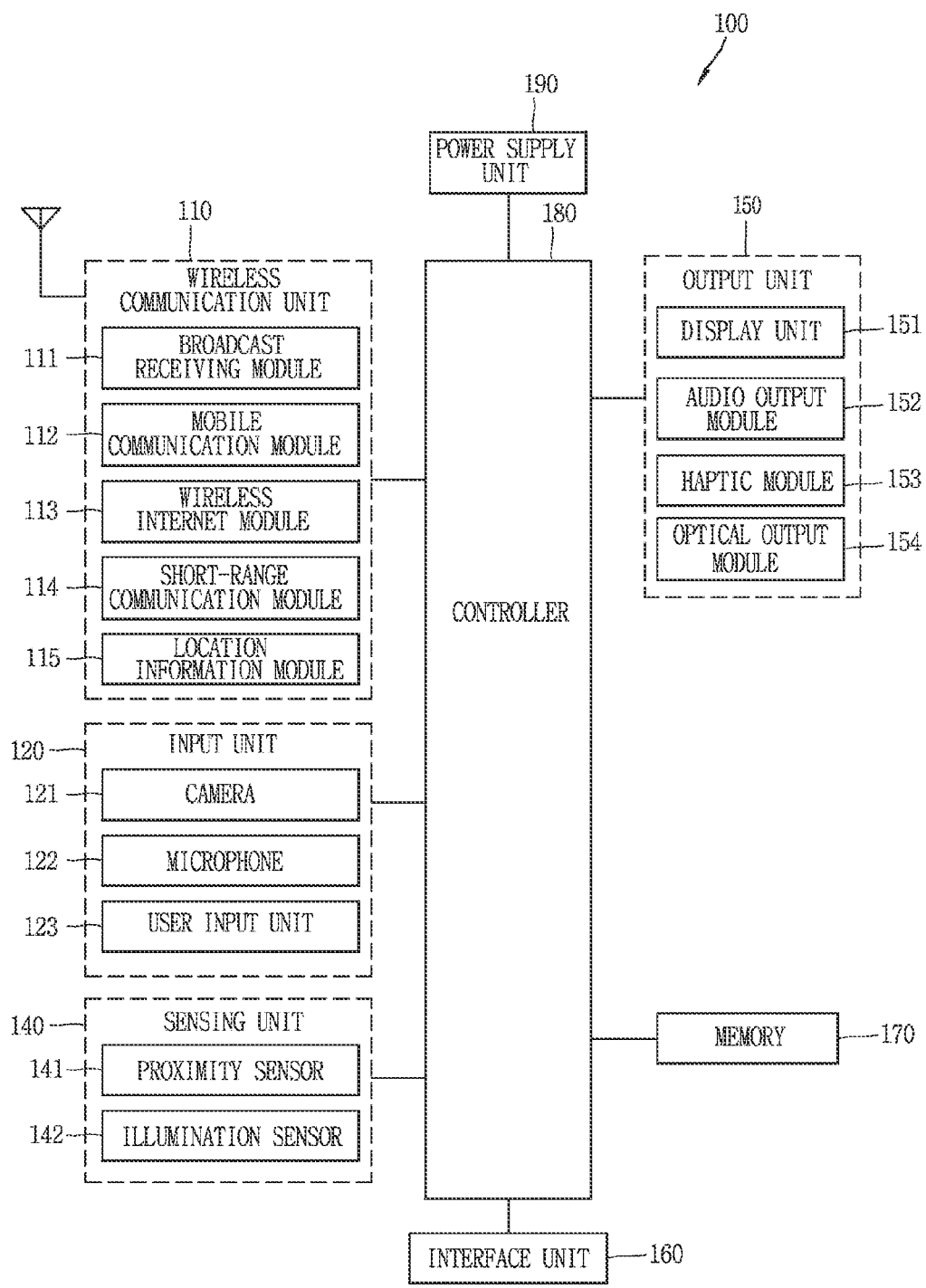

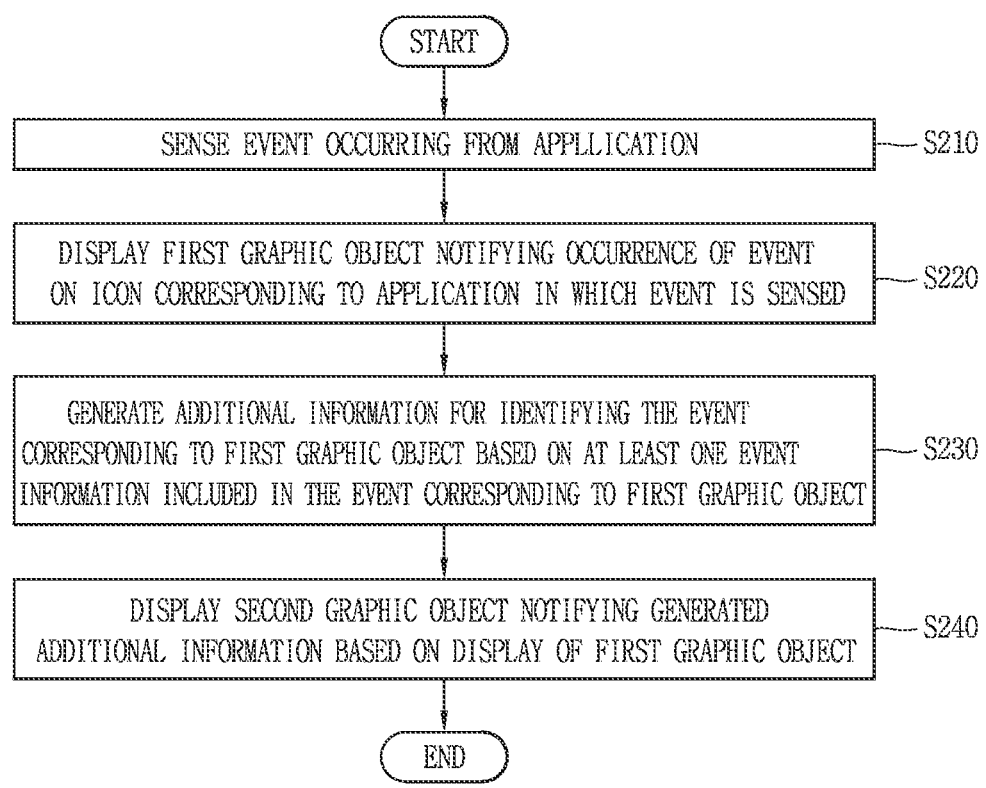

FIG. 3B
(a) 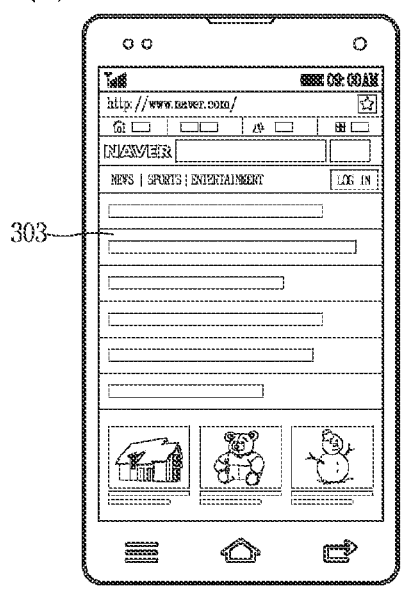
(b) 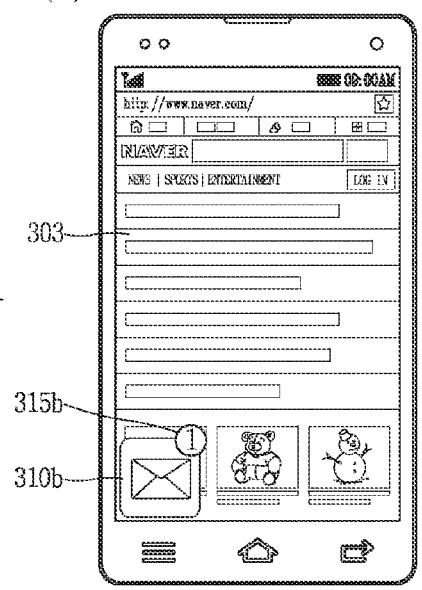
(c) 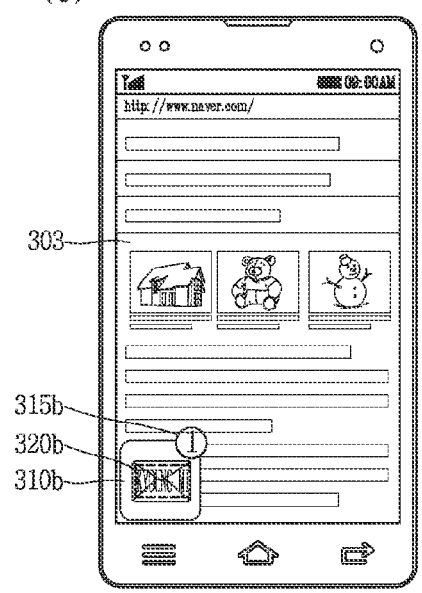

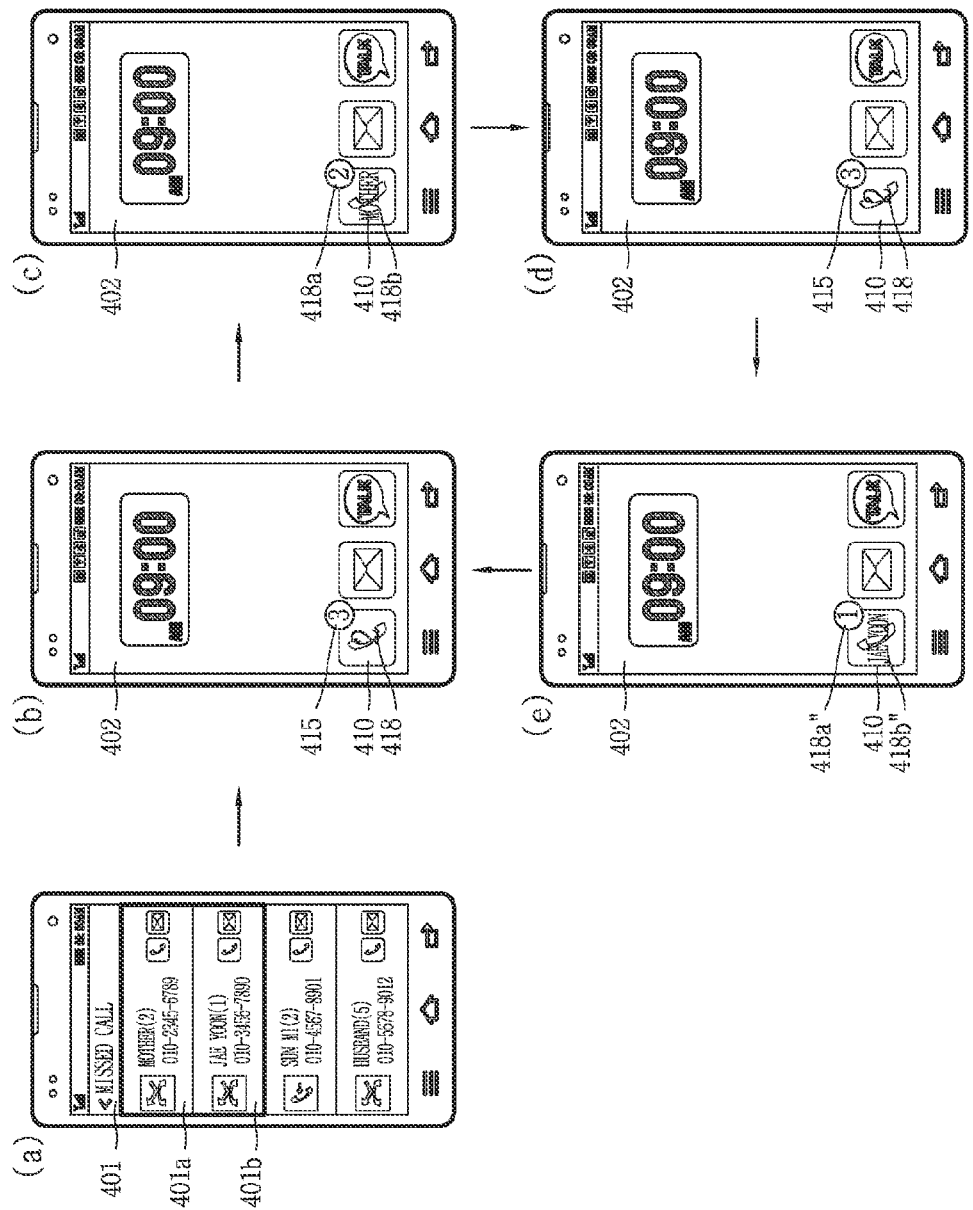

FIG. 4B
(a) 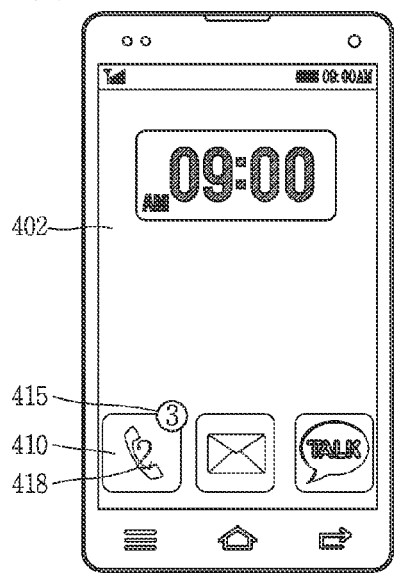
(b) 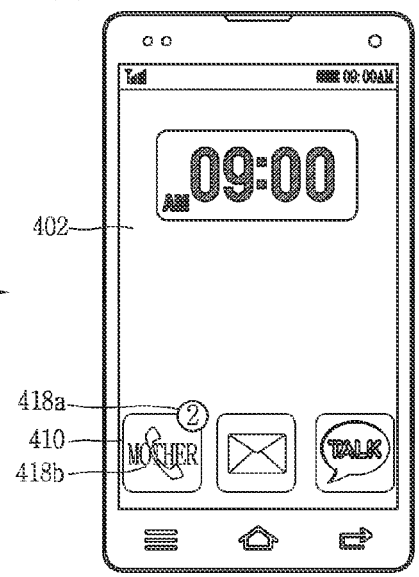
(d) 
(c) 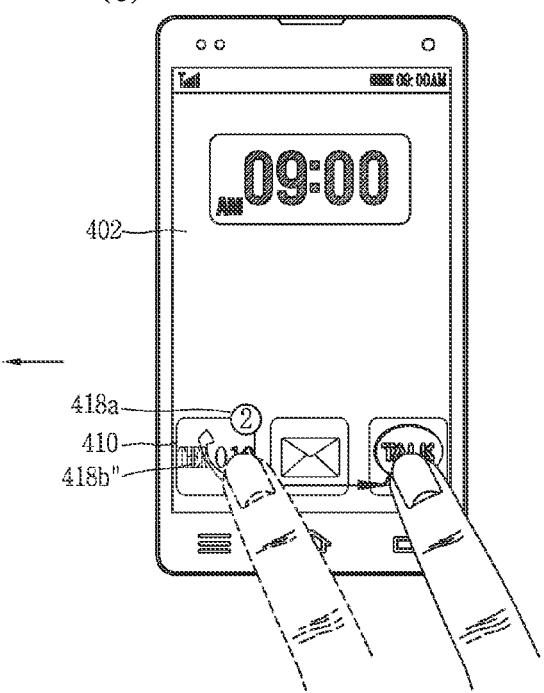

FIG. 4C
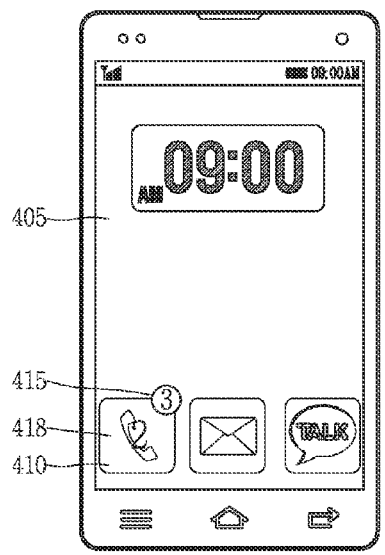
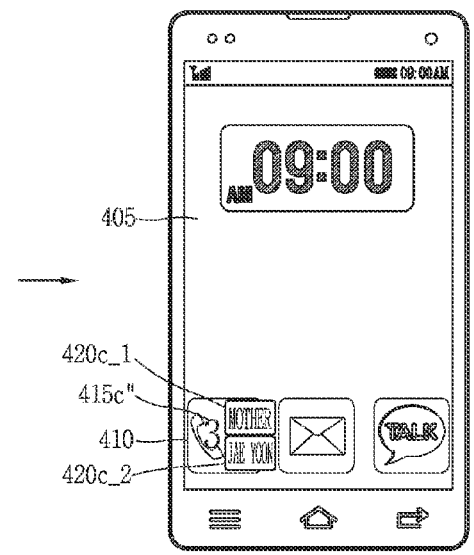
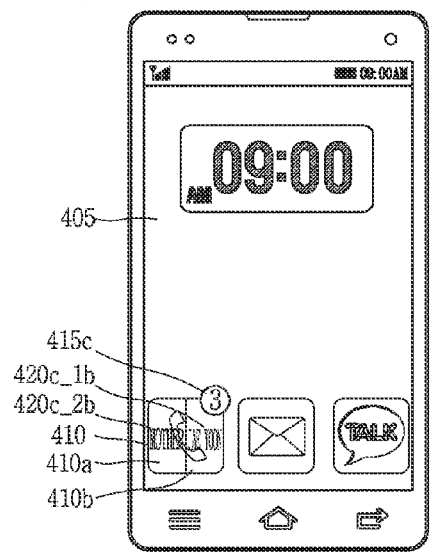

FIG. 5
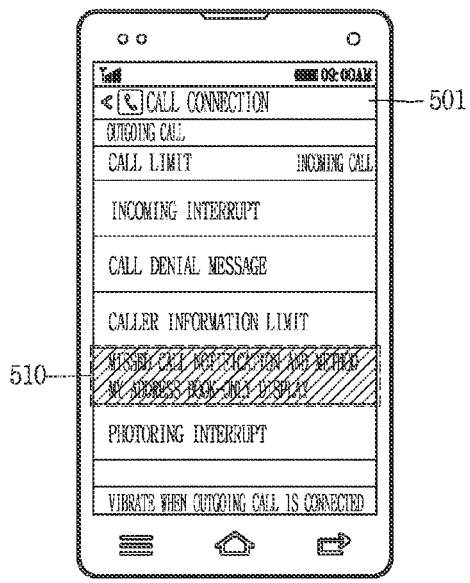
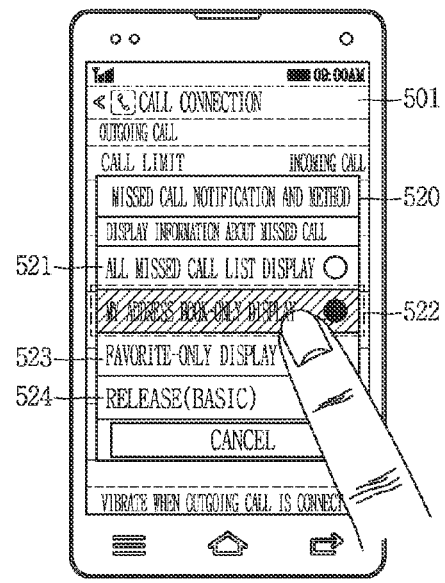
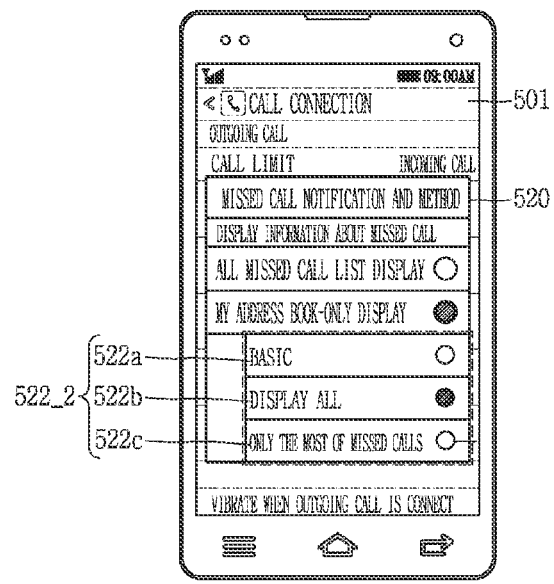

FIG. 6D
(a) 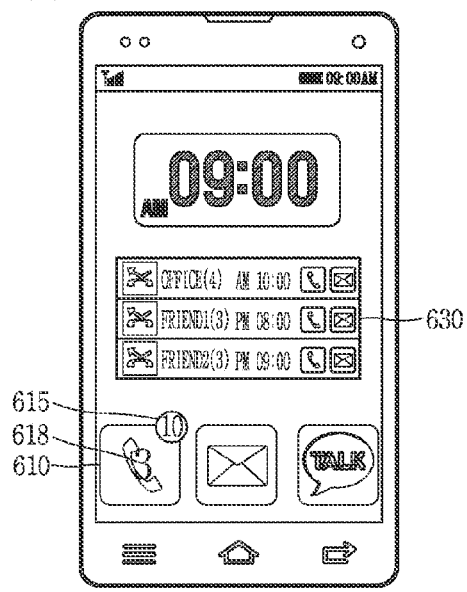
(b) 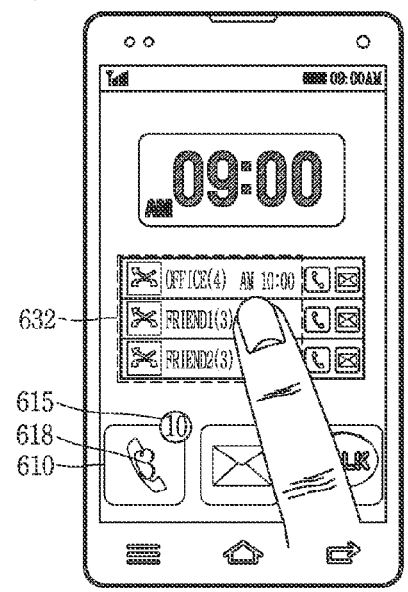
(c) 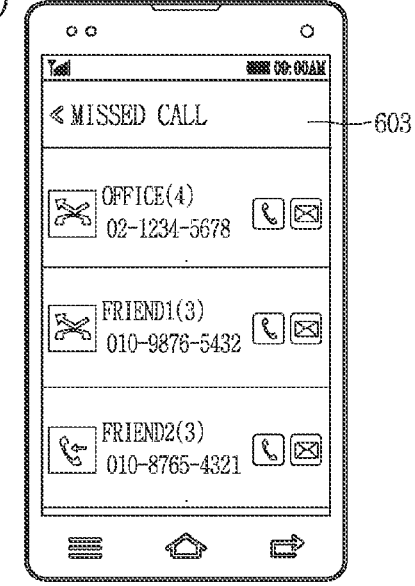

FIG. 9
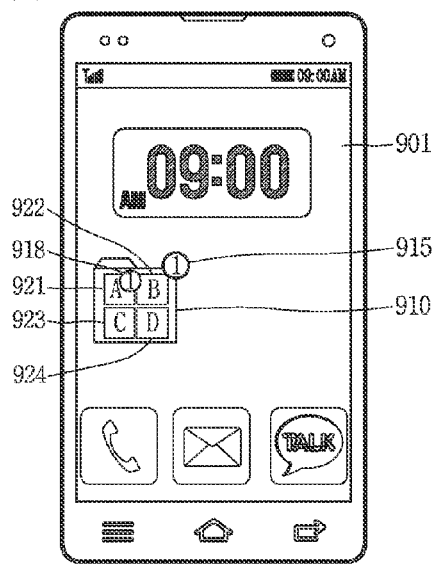
(a)
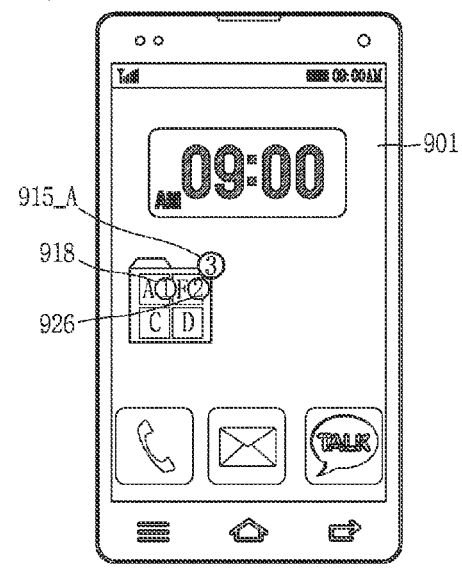
(b)
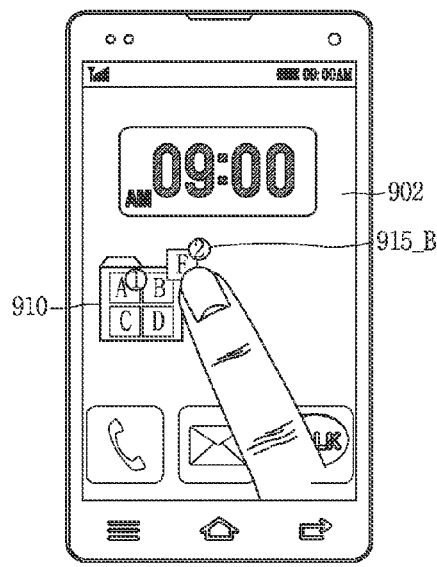
(b")
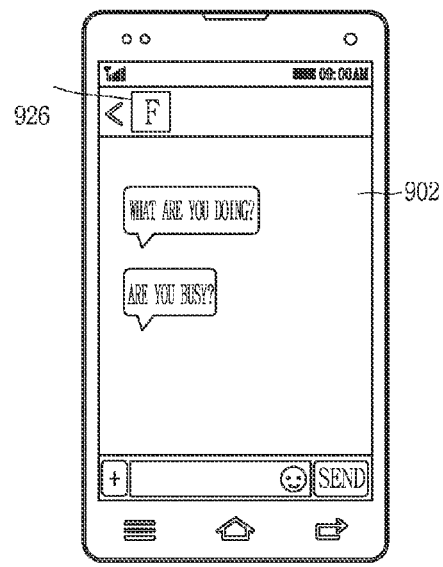
(c)

FIG. 10B
(a) 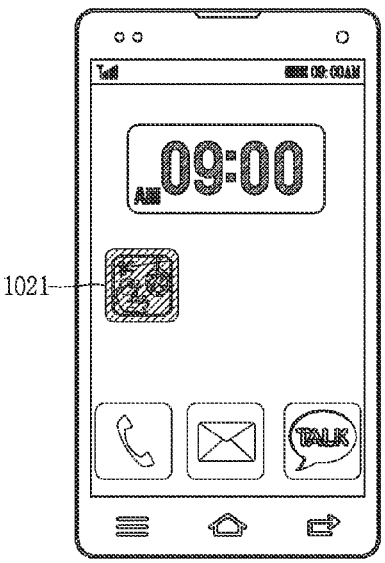 (b) 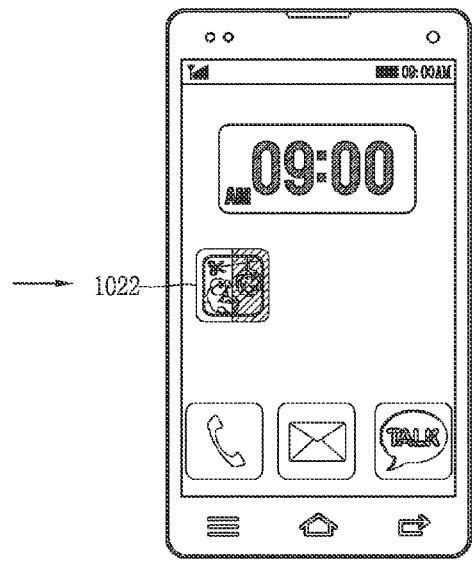
(c) 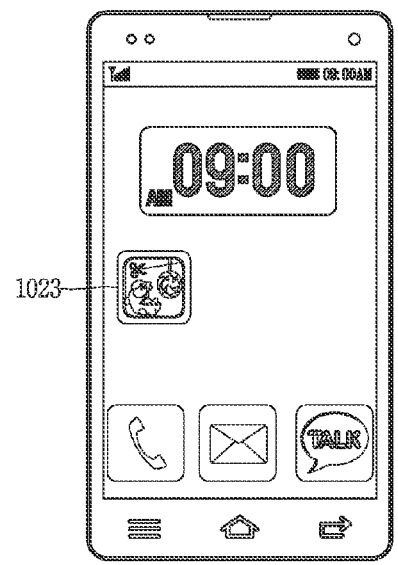

FIG. 10C
(a)
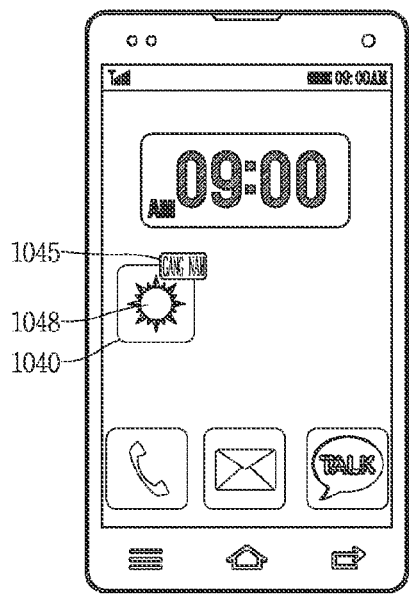
(b)
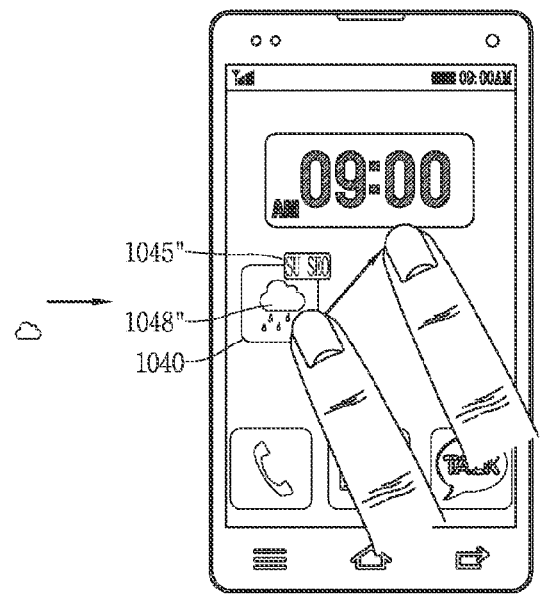
(c)
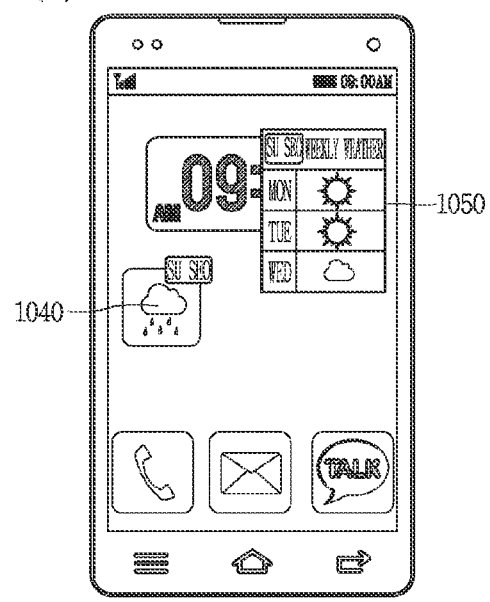

MOBILE TERMINAL AND CONTROL METHOD FOR THE MOBILE TERMINAL

CROSS-REFERENCE TO RELATED APPLICATION

Pursuant to 35 U.S.C. §119(a), this application claims the benefit of earlier filing date and right of priority to Korean Application No. 10-2014-0063930, filed on May 27, 2014, the contents of which is incorporated by reference herein in its entirety.

BACKGROUND OF THE INVENTION

1. Field of the Invention

This present invention relates to a mobile terminal and a corresponding method for notifying the occurrence of an event in an application.

2. Background of the Invention

Terminals may be generally classified as mobile/portable terminals or stationary terminals. Mobile terminals may also be classified as handheld terminals or vehicle mounted terminals. Mobile terminals have become increasingly more functional. Examples of such functions include data and voice communications, capturing images and video via a camera, recording audio, playing music files via a speaker system, and displaying images and video on a display.

Some mobile terminals include additional functionality which supports game playing, while other terminals are configured as multimedia players. More recently, mobile terminals have been configured to receive broadcast and multicast signals which permit viewing of content such as videos and television programs.

In such a mobile terminal, when an event, for example, a call incoming event, a message incoming event, or an update event is sensed in at least one application, the occurrence of the event can be notified through an idle screen and the like before a relevant application is executed. However, there is a limit to information associated with the event that can be displayed on the idle screen and the like without executing the relevant application. Particularly, because the mobile terminal displays minimum information about the unchecked event, for example, only the number of events that have occurred on the idle screen and the like are displayed. If the events occurred a long time ago, the relevant application has to be executed to check the information associated with the event.

SUMMARY OF THE INVENTION

Therefore, one aspect of the present is to provide a mobile terminal and corresponding method for continuously displaying additional information about an event occurring from an application on a screen without executing the corresponding application.

Another aspect of the present invention is to provide a mobile terminal and corresponding method for continuously holding a notification display for a checked event.

In still another aspect, the present invention provides a mobile terminal and corresponding method for directly checking information associated with a specific event irrespective of an order that events occur when an application having a plurality of events occur is executed.

To achieve these and other advantages and in accordance with the purpose of this specification, as embodied and broadly described herein, the present invention provides in one aspect a mobile terminal including a wireless communication unit configured to perform wireless communication; a display unit configured to display an icon corresponding to an application; and a controller configured to display a first graphic object on the display unit along with the icon indicating first information about an event that has occurred with respect to the application, and display a second graphic object on the display unit including second information about the event that has occurred in which the second information includes more detailed information than the first information.

In another aspect, the present invention provides a method of controlling a mobile terminal, and which includes displaying, via a display unit of the mobile terminal, an icon corresponding to an application; displaying a first graphic object on the display unit along with the icon indicating first information about an event that has occurred with respect to the application; and displaying a second graphic object on the display unit including second information about the event that has occurred in which the second information includes more detailed information than the first information.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate embodiments and together with the description serve to explain the principles of the invention.

In the drawings:

FIG. 1A is a block diagram illustrating a mobile terminal according to an embodiment of the present invention;

FIG. 2 is a flowchart illustrating a method of controlling a mobile terminal according to an embodiment of the present invention;

FIGS. 3A and 3B are conceptual diagrams illustrating the method of controlling the mobile terminal shown in the flowchart of FIG. 2;

FIGS. 4A to 4C are overviews showing various embodiments in which additional information of an event is displayed on an icon corresponding to an application In accordance with an embodiment of the present invention;

FIG. 5 includes overviews showing a method of setting a criterion for generating additional information of an event in accordance with an embodiment of the present invention;

FIGS. 6A to 6D are overviews showing a method of outputting a popup window associated with additional information of an event in accordance with an embodiment of the present invention;

FIG. 9 includes overviews showing a method of displaying additional information of an event on a folder icon including a plurality of applications in accordance with an embodiment of the present invention; and FIGS. 10A to 10C are overviews showing various embodiments in which additional information of an event is changed according to a type of an application in accordance with an embodiment of the present invention.

DETAILED DESCRIPTION OF THE INVENTION

Description will now be given in detail of preferred configurations of mobile terminals according to an embodiment of the present invention, with reference to the accompanying drawings.

A terminal in the present description may include a mobile terminal such as a portable phone, a smart phone, a notebook computer, a digital broadcasting terminal, Personal Digital Assistants (PDA), Portable Multimedia Player (PMP), a navigation system, a slate PC, a tablet PC, an ultra book, a wearable device (e.g., smart watch), a glass-type terminal (e.g., smart glass), a head mounted display (HMD), etc. However, the present invention may be also applicable to a fixed terminal such as a digital TV, a desktop computer and a digital signage, except for specific configurations for mobility.

Figure 1B:
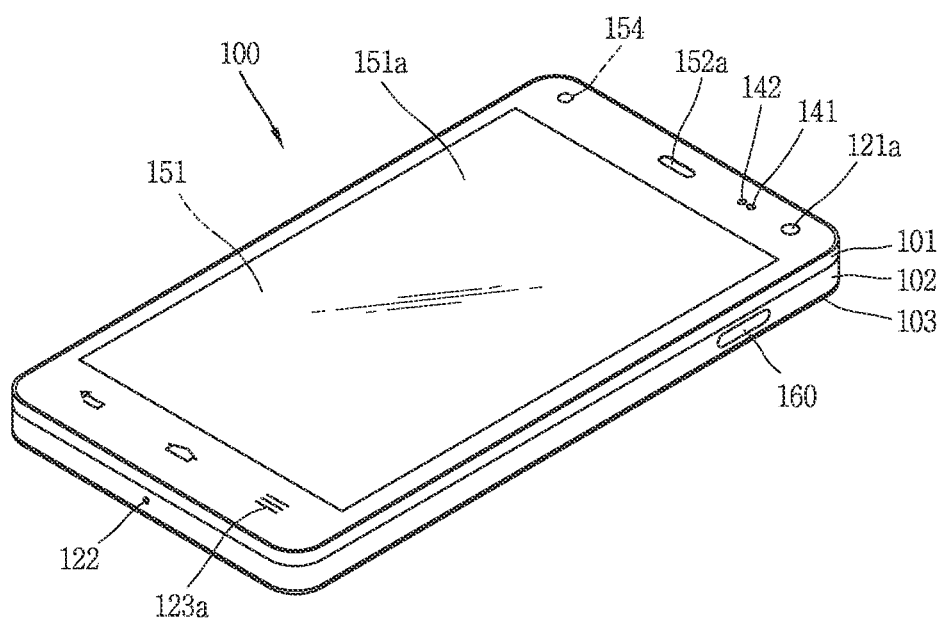
FIGS. 1B and 1C are overviews illustrating front and rear sides of a mobile terminal according to an embodiment of the present invention.
Figure 1C:
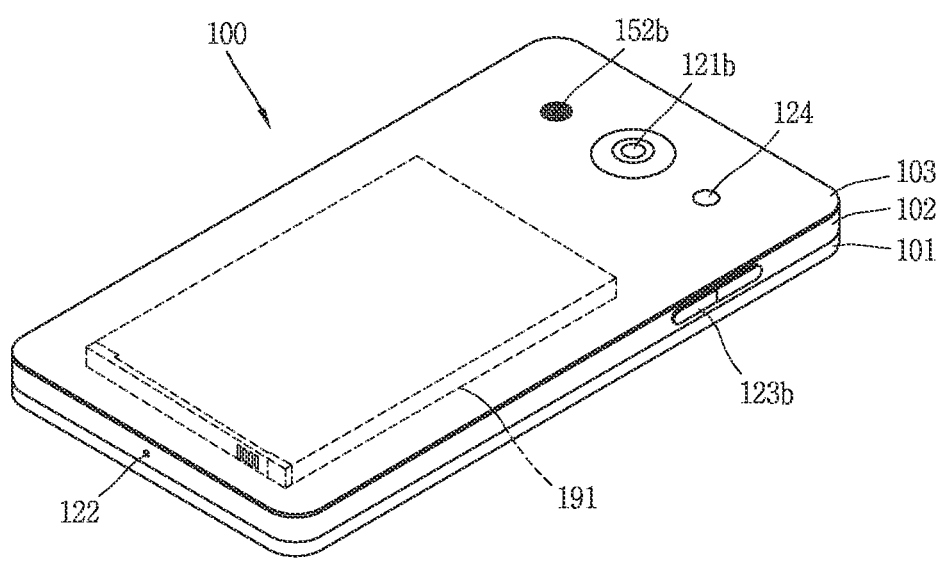

Reference is now made to FIGS. 1A-1C, where FIG. 1A is a block diagram of a mobile terminal in accordance with the present invention, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. Implementing all of the illustrated components of FIG. 1A is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some instances, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control an overall operation of the mobile terminal 100, in addition to the operations associated with the application programs. The controller 180 can provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), Wideband CDMA (WCDMA), High Speed Downlink Packet access (HSDPA), Long Term Evolution (LTE), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 can transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, GSM, CDMA, WCDMA, LTE and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which can exchange data with the mobile terminal 100 (or otherwise cooperate with the mobile terminal 100). The short-range communication module 114 may sense or recognize the wearable device, and permit communication between the wearable device and the mobile terminal 100.

In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. Further, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this instance, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 can sense which region of the display unit 151 has been touched. Here, the touch controller may be a component separate from the controller 180, the controller 180, and combinations thereof.

In some embodiments, the controller 180 can execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor. Implementing the camera 121 with a laser sensor may allow detection of a touch of a physical object with respect to a 3D stereoscopic image. The photo sensor may be laminated on, or overlapped with, the mobile terminal. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented so the mobile terminal emits monochromatic light or light with a plurality of colors. The signal output may be terminated as the mobile terminal senses that a user has checked the generated event, for example.

A projector may also be placed anywhere on the mobile terminal 100. The projector includes a light source element, an image forming module, and a lens, and is configured to project image information. The light source element emits light, and the image forming module forms image information (or screen information) with light. The lens magnifies and projects image information, and may be placed corresponding to a projection hole. The projector is also referred to as a beam projector.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 can typically control the general operations of the mobile terminal 100. For example, the controller 180 can set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected. As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151*a* of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121*b* or an audio output module 152*b*.

The cases 101, 102, 103 may be formed by injection-molding synthetic resin or may be formed of a metal, for example, stainless steel (STS), aluminum (Al), titanium (Ti), or the like. As an alternative to the example in which the plurality of cases form an inner space for accommodating components, the mobile terminal 100 may be configured such that one case forms the inner space. In this example, a mobile terminal 100 having a uni-body is formed so synthetic resin or metal extends from a side surface to a rear surface.

If desired, the mobile terminal 100 may include a waterproofing unit for preventing introduction of water into the terminal body. For example, the waterproofing unit may include a waterproofing member which is located between the window 151*a* and the front case 101, between the front case 101 and the rear case 102, or between the rear case 102 and the rear cover 103, to hermetically seal an inner space when those cases are coupled.

FIGS. 1B and 1C depict certain components as arranged on the mobile terminal. However, alternative arrangements are possible and within the teachings of the instant invention. Some components may be omitted or rearranged. For example, the first manipulation unit 123*a* may be located on another surface of the terminal body, and the second audio output module 152*b* may be located on the side surface of the terminal body.

The display unit 151 outputs information processed in the mobile terminal 100. The display unit 151 may be implemented using one or more suitable mobile terminals. Examples of such suitable mobile terminals include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two mobile terminals, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151*a* and a display on a rear surface of the window 151*a*, or a metal wire which is patterned directly on the rear surface of the window 151*a*. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 3A). Therefore, the touch screen may replace at least some of the functions of the first manipulation unit 123*a*.

The first audio output module 152a may be implemented in the form of a speaker to output voice audio, alarm sounds, multimedia audio reproduction, and the like. The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this instance, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like.

FIG. 1B illustrates the first manipulation unit 123a as a touch key, but possible alternatives include a mechanical key, a push key, a touch key, and combinations thereof. Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject. As shown in FIG. 1C, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 (refer to FIG. 1A) may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

A mobile terminal 100 may include at least one of components described above and may immediately receive additional information associated with an event occurring from an application even without executing the application. A control method for displaying additional information associated with the event occurring from an application using a notification icon of an event and controlling the associated function as will be described below in detail by way of example. The proximity sensor 141 and illumination sensor 142 are also shown in FIG. 1B.

Next, FIG. 2 is a flowchart illustrating a method of controlling the mobile terminal according to an embodiment of the present invention, and FIG. 3 is an conceptual diagram illustrating the flowchart of FIG. 2. As shown, the controller 180 senses an event occurring from at least an application (S210).

The "application" may be represented by an "application program" or an "applied program," and refers to all type of programs that can be driven in a terminal Such an application may be, for example, a program associated with a program for displaying a web browser, moving image reproduction, schedule management, a calling operation, a game, music, a document work, a message, monetary, an e-book, traffic information, an application to be updated, etc.

Further, an "event" occurring from the application corresponds to influencing an operation of at least one application installed in a terminal body, changing an item of a database (or a database file) associated with the at least one application, or transferring or transmitting data with an external terminal or an external network through the at least one application.

For example, the event may occur when there is a missed call, when there is an application to be updated, when a message is received, when the terminal is charged, when the terminal is powered on, when the terminal is powered off, when an LCD awake key is pressed, when the alarm rings, when the incoming call is performed, and when the missed notification is performed. Further, when specific information is received through the wireless communication unit 110, an event may occur from an application associated with the received specific information.

The controller 180 can change a screen that has been displayed on the display unit 151 to a screen corresponding to the event in response to occurrence of an event from at least one application. In addition, when a response to the event that has occurred is not received, the controller 180 can change the switched screen back to a previous screen before the event.

Figure 3A:
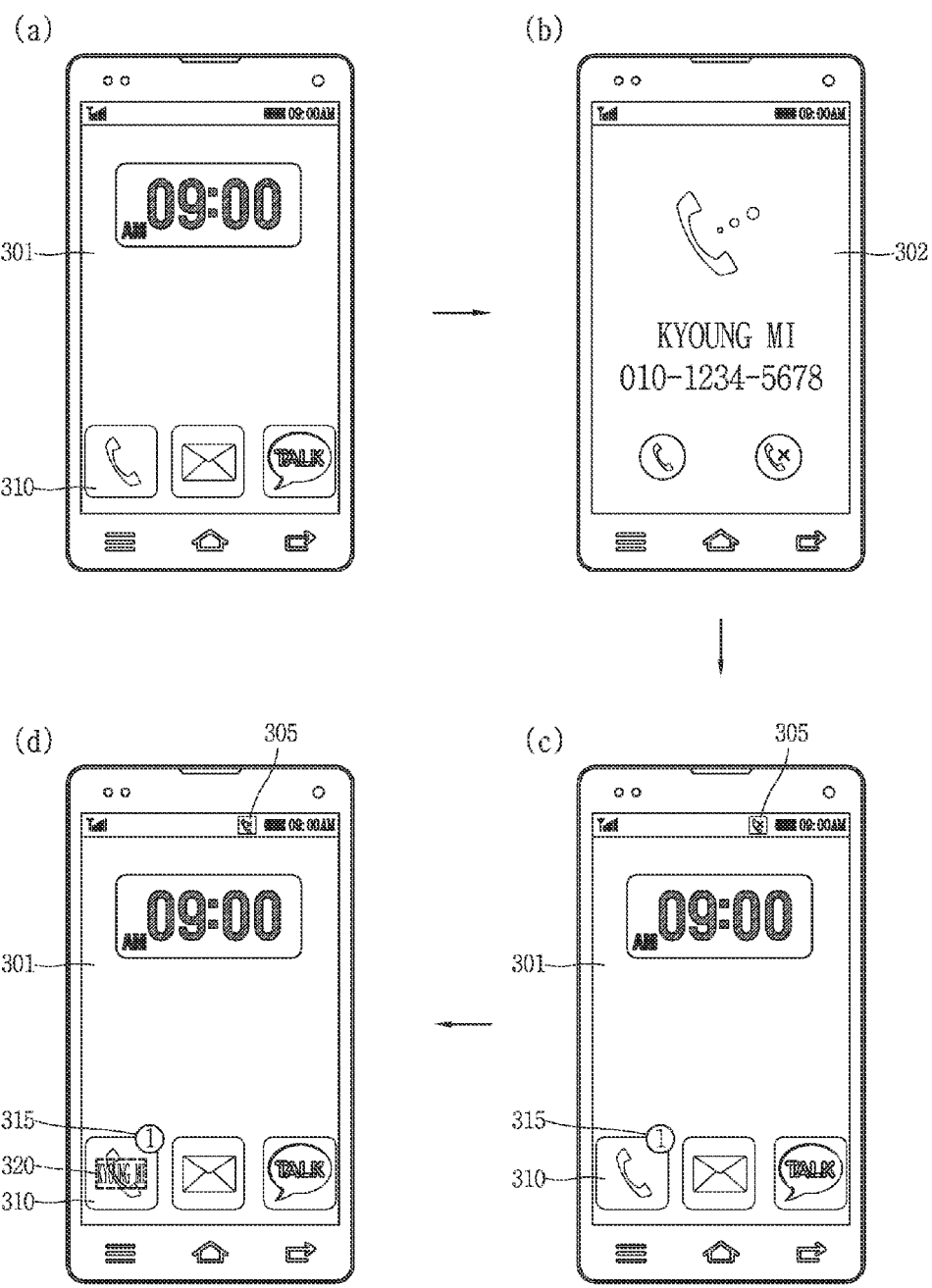

For example, as illustrated in (a) and (b) of FIG. 3A, when a call signal is received while a home screen page 301 is displayed on the display unit 151, the screen is changed to a call incoming screen 302 corresponding to the received call signal. Also, when a user does not respond to the received call signal, as illustrated in (c) of FIG. 3A, the screen is switched to the home screen page 301 displayed before the call incoming event occurs.

Further, the controller 180 displays a first graphic object notifying the occurrence of the event on the display unit 151 along with an icon corresponding to the relevant application in response to sensing of the event (S220). An icon corresponding to the application is, for example, an object that indicates an application installed in a terminal. When a preset touch input is applied to a relevant icon, the corresponding application is executed. For example, icons for executing a call application, a message application, and a gallery application installed in the terminal may be displayed on the home screen page.

In addition, the first graphic object is an image notifying minimum information associated with occurrence of the event, and may be, for example, a notification icon notifying the number of events that has occurred. Such a first graphic object can be, for example, adjacent to the icon of the application displayed on the home screen page of the display unit 151.

Here, the first graphic object may be changed to different images depending on a type of the application that has occurred. The different images indicate, for example, images having different display types, shapes, colors, or sizes, and so on. For example, as illustrated in (c) of FIG. 3A, the controller 180 can display a notification icon 315 notifying a non-response to the call incoming event adjacent to an icon 310 of the call application. Also, an image 305 notifying a non-response to the call incoming event is further displayed on a status display bar displayed on an upper end of the display unit 151

As described above, when the notification icon (i.e., a "first graphic object") is displayed on the icon of the application having the sensed event, although the user does not execute the relevant application, the user can immediately recognize occurrence of the event. However, the home screen page displayed on the display unit 151 is merely an example, and the controller 180 can display the icon of the application having the event that has occurred and the notification icon on the screen corresponding to the application that is currently being executed.

In this instance, the icon of the application having the event that has occurred and the notification icon are displayed on one area of the screen currently displayed on the display unit 151. In addition, even when information displayed on the display unit 151 according to a preset touch input is vertically scrolled, the icon of the application having the event that has occurred and the notification icon may be displayed on a fixed area.

For example, as illustrated in (a) of FIG. 3B, when an event occurs from a message application while a specific web page 303 based on execution of a web application is displayed on the display unit 151, as shown in (b) of FIG. 3B, an icon 310b of a message application having the event that has occurred and a notification icon 315b notifying the occurrence of the event may be displayed on one area of the web page 303, for example, a left side area of a lower end.

Further, because such a notification icon provides only minimum information associated with the occurrence of the event (e.g., the number of events that has occurred), a user generally performs a relevant application or an additional operation so as to check more detailed information associated with the event. In addition, the notification message that is popped up on the display unit 151 when the event occurs is displayed on the display unit 151 only for a predetermined period of time, and only the event that has recently occurred is displayed. As such, after that, the user executes the application having the event that has occurred and checks the corresponding event information.

Thus, the controller 180 according to an embodiment of the present invention generates additional information for identifying the event corresponding to the first graphic object based on at least one piece of event information included in the event corresponding to the notification icon (i.e., first graphic object) (S230). Here, at least one piece of event information is varied depending on a type of the event that has occurred. For example, for a message incoming event, event information may be content of a message, a message sender, a phone number, and an attachment. Also, for an update event, event information may be an update capacity, version information, and an update provider.

Here, "additional information" for identifying an event includes all additional detailed information other than information recognized through a notification icon (i.e., "first graphic object"), such as a type of the event that has occurred, an occurrence time of the event, and positional information of a terminal when the event occurs. For example, when there is a missed call, the "additional information" may be caller information or information about a time at which the missed call is received. In another example, when there multiple received messages, the "additional information" may be sender information and the number of received messages for each sender.

Subsequently, the controller 180 displays a second graphic object notifying the additional information that has occurred on the display unit 151 based on a display of the first graphic object (S240). The second graphic object is an image visually notifying additional information for identifying the event that has occurred, and may be, for example, an indicator icon notifying the sender information of the event that has occurred or a time at which the event occurs. Such a second graphic object may be displayed on at least one of an icon and the first graphic object.

Here, the second graphic object being based on a display of the first graphic object means that, when the display of the first graphic object is changed, a display of the second graphic object is also correspondingly changed. For example, when the first graphic object is an image indicating information about the number of the events that has occurred (e.g., "2"), and the second graphic object is an image indicating a time at which the most recent event occurs (e.g., 10:00 a.m.), if the first graphic object is changed (e.g., "3") due to a newly sensed event, the second graphic object is also correspondingly changed (e.g., 10:30 a.m.).

Furthermore, the controller 180 can differently change a position on which the second graphic object is displayed in order to further provide lower-order information on additional information. For example, when the second graphic object is displayed on the first graphic object and when the second graphic object is displayed on the icon, different information may be provided, and different information may be provided depending on an area in which the second graphic object is displayed in the icon. In other words, the controller 180 can provide additional information such as the elapse of time and a change in importance as the display of the second graphic object is changed from a first position to a second position. For example, the user can recognize an elapsed time after a time at which the event has occurred by a change in a display position of the second graphic object.

As illustrated in (d) of FIG. 3A, caller information 320 corresponding to a missed call notification icon 315 may be displayed in the icon 310 of a call application displayed on the home screen page 301. Therefore, the user does not have to check a list of missed calls, and can immediately recognize that there is one missed call and the number of callers is "small" through the first and second graphic objects 315 and 320 on the home screen page 301.

As illustrated in (c) of FIG. 3B, provision of such information is particularly useful when the screen 303 in which another application is executed is currently displayed on the display unit 151. In other words, even when the user does not touch the icon 310b of the message application to execute the relevant application in (b) of FIG. 3B, the user can immediately receive additional information about the event that has occurred by displaying information 320b of the sender that sends a message to overlap with the icon 310b as shown in (c) of FIG. 3B. This minimizes hiding the screen compared to when the user is notified of the event that has occurred using a popup message displayed on the upper end of the display unit 151, and so causes a plurality of events to be displayed as will be described below in detail.

As described above, in the embodiment of the present invention, even when the user does not execute the application having the event that has occurred, the user can immediately receive the additional information about the non-checked event without extra manipulation. FIG. 3B(b) and (c) show the screen 304 being scrolled with the icon 310b with information 310b and 315b not being scrolled with the screen 303.

Next, FIGS. 4A to 4C are overviews showing various embodiments in which additional information on an event is displayed on an icon corresponding to an application. In particular, various methods of displaying additional information on a plurality of events are illustrated. In addition, icons of applications corresponding to different applications may be displayed on the home screen page displayed on the display unit 151. In this instance, a separation distance between the displayed icons is reduced. Therefore, it is preferable that the second graphic object notifying the additional information of the event be intuitively recognized and a display thereof be simply implemented.

When the plurality of pieces of additional information corresponding to the event are generated, the controller 180 can display a plurality of second graphic objects corresponding to the plurality of pieces of additional information on a plurality of areas adjacent to the icon. For example, referring to (a) of FIG. 4C, the user can recognize three missed calls through a first graphic object 415 and that the three missed calls come from two callers through a second graphic object 418 based on an icon 410 of a call application displayed on a home screen page 405.

In this instance, in order to provide information about a plurality of callers, as shown in (b) of FIG. 4C, the controller 180 can display notification information 415c''' corresponding to the first graphic object on the icon 410, and display a plurality of graphic objects 420c_1 and 420c_2 notifying the plurality of callers ("MOTHER," "JAE YOON") overlapping an area adjacent to the icon 410, for example, an edge area of the icon.

The graphic objects 420c_1 and 420c_2 can also be rotatably displayed in one direction (e.g., a clockwise direction) in order in which the events occur. In (b) of FIG. 4C, when the caller information is displayed in a clockwise direction, the user can check that the missed calls first come from "MOTHER," and then from "JAE YOON."

The controller 180 can display the plurality of second graphic objects corresponding to a plurality of pieces of additional information to be distinguished from a plurality of areas in the icon. For example, referring to (b") of FIG. 4C, the plurality of second graphic objects 420c_1b and 420c_2b notifying the plurality of callers ("MOTHER," "JAE YOON") can be displayed on a first area 410a and a second area 410b in the icon, respectively, while the first graphic object 415c notifying the number of missed calls is displayed adjacent to the icon 410.

The plurality of areas generated in the icon are determined by the number of second graphic objects. For example, when the number of second graphic objects is four, the first area 410a and the second area 410b may be further partitioned into four areas, and the plurality of callers may be displayed on the four partitioned areas.

The controller 180 can further display detailed information about the additional information corresponding to the second graphic object on at least one of the icon and the first graphic object. Here, the detailed information corresponds to another event information generated using the additional information corresponding to the second graphic object. The controller 180 can determine the detailed information based on preset information. The description thereof will be given below in greater detail with reference to FIG. 5.

For example, when addition information about a notification icon ("first graphic object") notifying ten missed calls includes the ten missed calls come from three callers, each Identification information about the three callers (e.g., an address book name, a phone number, and the like) can be displayed as detailed information about such additional information. In this instance, the controller 180 can alternately display the second graphic object indicating only the additional information and the changed second graphic object further indicating the detailed information about the additional information on the display unit 151 at a preset period of time interval.

For example, as shown in (a) of FIG. 4A, there are three missed calls 401 including 2 calls 401a from "MOTHER" and 1 call 401b from "JAE YOON." As shown in (b) of FIG. 4A, the notification icon 415 indicating the number of missed calls (e.g., three) is displayed on an area adjacent to the icon 410 of the call application displayed on the home screen page 402, and the graphic object 418 indicating the number of different callers (e.g., two) is displayed to overlap the icon 410. In this instance, a preset transparency may be applied to the graphic object 418 such that the image that has been originally displayed on the icon 410 is maintained.

Next, using the second graphic object 418 indicating that the number of the different callers is two, as shown in (c) of FIG. 4A, the identification information 418b of a first caller, that is, "MOTHER" instead of "2" is displayed on the icon 410, and the number of missed calls corresponding thereto, that is, "2" is displayed on the area 418a on which the notification icon has been displayed. A preset highlighting effect (e.g., change in color or transparency) may be output so that the user can recognize a change of the notification icon 415 to the graphic object notifying the number of missed calls of the first caller.

Also, as shown in (d) of FIG. 4A, the screen is returned to the previously displayed screen shown in (b) of FIG. 4A. Further, the identification information 418b" of the next caller, that is, "JAE YOON" instead of "2" is displayed on the icon 410 as shown in (d) of FIG. 4A, and the number of missed calls corresponding thereto, that is, "1" is displayed on the area 418a" on which the notification icon has been displayed.

Further, only the identification information about the caller that coincides with a preset criterion may be displayed rather than the identification information of the callers of all the missed calls. For example, using only the identification information of the caller who has the most of the ten missed calls, the screens shown in (b) and (c) of FIG. 4A may be alternately displayed.

The controller 180 can exhibit a display corresponding to a flow of the elapsed time after the time the first or second graphic object displayed on the icon is displayed on the icon. For example, if the first or second graphic object corresponds to the event that has recently occurred (e.g., that has occurred within 30 minutes), the first graphic object and/or the second graphic object may be displayed in a deepened and vivid hue, and then the hue, saturation, and brightness may become dull and a fading effect may occur over time. Moreover, such a change in display of the graphic object can be applied in proportion to the number in which the user checks the icon.

Further, the controller 180 can display the additional information or the detailed information on the additional information as a dynamic image depending on an amount of information of the additional information corresponding to the second graphic object or the detailed information on the additional information. In other words, when the additional information corresponding to the second graphic object or the detailed information on the additional information is not displayed on the icon or the notification icon (i.e., "first graphic object") at one time, the additional information or the detailed information on the additional information may be displayed as a dynamic image that moves in a preset direction.

For example, referring to (a) of FIG. 4B, the first and second graphic objects 415 and 418 respectively indicating the number of missed calls and the number of different callers are first displayed on the icon 410 of the call application displayed on the home screen page 402 and as shown in (b) and (c) of FIG. 4B notification icon area 418a is displayed and, information 418b corresponding to "the first caller name" and "the phone number of the first caller" may be sequentially displayed and scrolled in one direction (e.g., a lateral surface direction) as the detailed information associated therewith. In other words, if the amount of information of the detailed information to be displayed is large, a dynamic image 418b may be used to display the entire detailed information.

Further, the controller 180 can differently set a moving speed of the dynamic image depending on the amount of information of the detailed information to be displayed. For example, if the amount of information of the detailed information to be displayed is large, the moving speed of the dynamic image can be increased. Also, in this instance, when a proximity touch gesture input is sensed with respect to the icon on which the dynamic image is displayed, as the controller 180 stops movement of the dynamic image or decreases the moving speed, the user can accurately check the displayed information.

Further, as described above, when a preset touch gesture input is sensed with respect to the icon of the application while the additional information corresponding to the second graphic object or the detailed information on the additional information is displayed as the dynamic image, the controller 180 can execute the application corresponding to the icon in association with the detailed information.

For example, when a preset touch gesture input, for example, a drag touch input is applied to the relevant icon 410 while the information 418b" corresponding to "the first caller name" and "the phone number of the first caller" of the missed calls are displayed on the icon 410 of the call application as the dynamic image in (c) of FIG. 4B, the "first caller" corresponding to the displayed dynamic image is called as shown in (d) of FIG. 4B. Further, when the drag touch input is applied to the icon 410 while the information 418b" corresponding to "the second caller name" and "the phone number of the second caller" of the missed calls are displayed in (c) of FIG. 4B, "the second caller" can be called.

The controller 180 can perform different control operations according to the type of the touch gesture input. For example, when the touch input applied to the icon 410 is dragged in one direction in (c) of FIG. 4B, "the first caller" corresponding to the displayed dynamic image 418b" is called. However, when a short-touch input is applied to the icon 410, the call application is executed and a list of telephone records including the missed calls is displayed. In this instance, when the user wants to call to "the first caller, the user can use the displayed list of telephone records to dial the phone number. As described above, when executing an application having several events that occurred, a desired specific event can be directly performed.

Next, FIG. 5 includes overviews illustrating a method of setting a criterion for generating the additional information of the above-mentioned event or the detailed information on the additional information in a terminal. A call application will be used as an example. As illustrated in (a) of FIG. 5, if an item "MISSED CALL NOTIFICATION AND METHOD" 510 is selected in a call setting menu screen 501, the controller 180 displays a popup window 520 as shown in (b) of FIG. 5. As such, the criterion of the additional information about the missed call or the detailed information on the additional information can be set.

A plurality of items 521 to 524 including different display ranges of the missed calls are displayed on the popup window 520. The items 521 to 524 may be, for example, an item "ALL MISSED CALL LIST DISPLAY" 521 notifying all the missed call, an item "MY ADDRESS BOOK-ONLY DISPLAY" 522 notifying only the missed call of the caller stored in my address book, an item "FAVORITE-ONLY DISPLAY" 523 notifying only the missed call of a specific caller, and an item "RELEASE" 524 that does not display the missed call.

When the item "MY ADDRESS BOOK-ONLY DISPLAY" 522 is selected, as illustrated in (c) of FIG. 5, items 522a, 522b, and 522c for setting a display method of the caller of the missed call are opened in a window 5222. The items 522a, 522b, and 522c may be, for example, an item "BASIC" 522a notifying only the number of different callers in the missed call, an item "DISPLAY ALL" 522b notifying all information about the caller of the missed call, and an item "ONLY THE MOST OF MISSED CALLS" 522c notifying information about the caller who has the most of the missed calls.

However, such items are merely examples and any item may be deleted or added. For example, FIG. 4A is an embodiment in which the item "DISPLAY ALL" 522b is selected in the popup window 520, and FIG. 4B is an embodiment in which the item "ONLY THE MOST OF THE MISSED CALLS" 522c is selected.

In addition, the more specific information corresponding to the displayed additional information can be displayed even without executing the application having the occurred event. In this regard, FIGS. 6A to 6D are overviews showing embodiments in which the more specific information associated with the additional information of the event is displayed using a popup window.

Figure 6A:
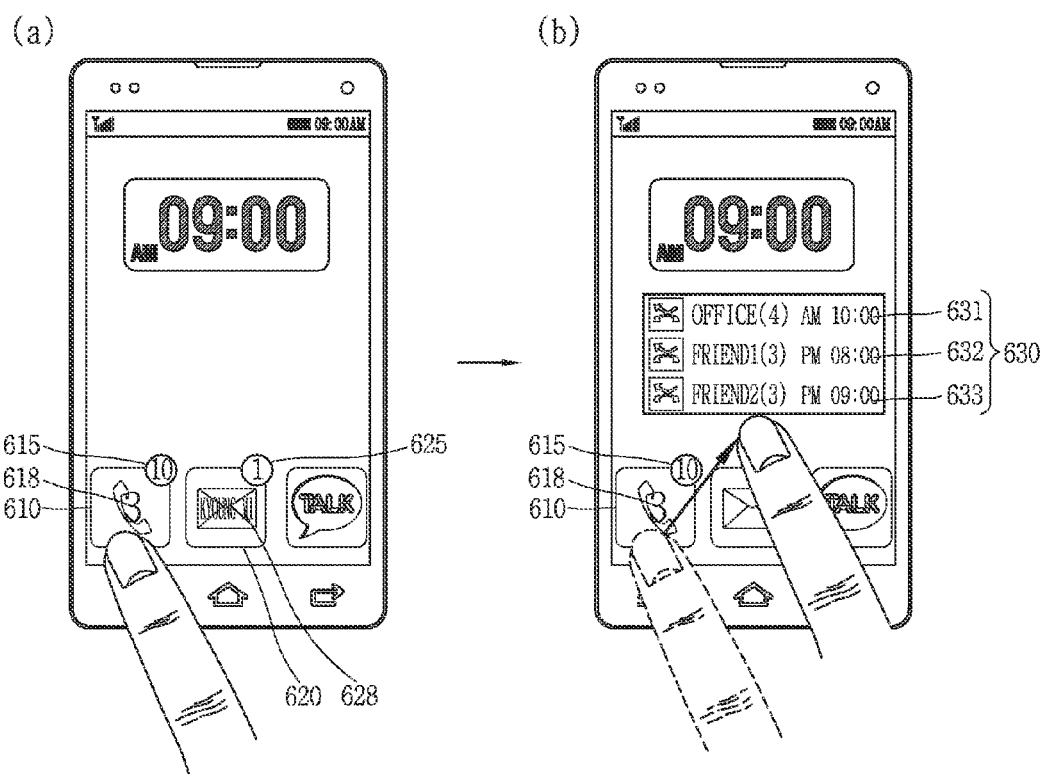
Figure 6B:
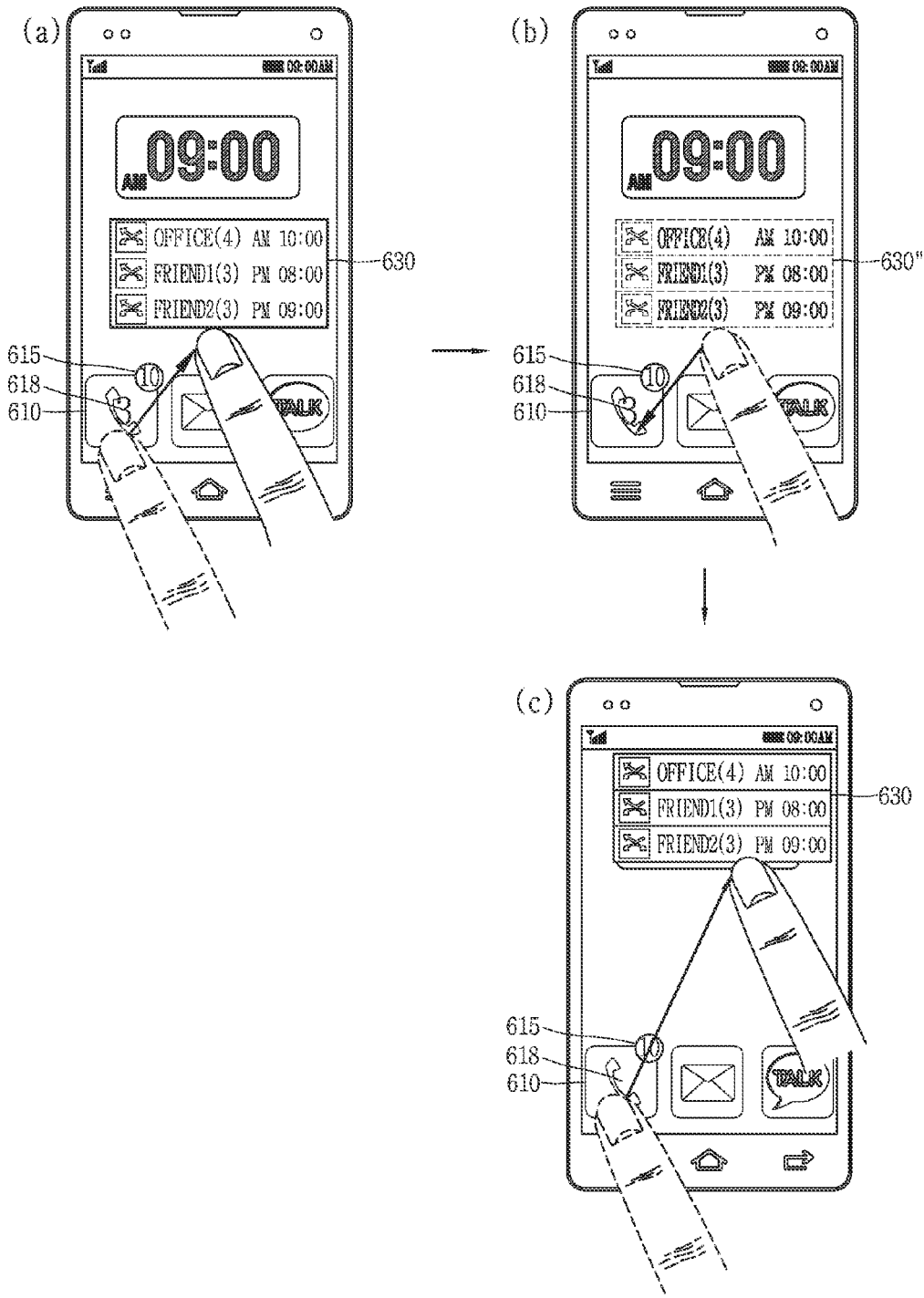

As illustrated in FIG. 6A, the controller 180 can display, for example, a notification icon 615 notifying the number of missed calls and a graphic object 618 notifying the number of different callers (e.g., "3") on a first icon 610 displayed on a home screen page in response to sensing of the event occurring from the application. In addition, a notification icon 625 notifying the number of received messages and a graphic object 628 notifying information about the caller of the message (e.g., "KYOUNG MI") can be displayed on a second icon 620 displayed on the home screen page.

As described above, while the notification icon (i.e., "first graphic object") notifying the occurrence of the event and the graphic object (i.e., "second graphic object") notifying the additional information associated with the event are displayed, the controller 180 can sense that a touch gesture input is applied to the second graphic object. In this instance, the controller 180 can perform different control operations according to a type of sensed touch gesture input.

Specifically, as illustrated in (b) of FIG. 6A, the controller 180 can display a popup window 630 associated with the second graphic object in response to application of a drag touch input to the second graphic object. At least one event item associated with the additional information about the event is displayed on the popup window 630.

Here, the at least one event item is visual information that more specifically indicates the additional information associated with the event displayed on the second graphic object. For example, when the event item is popped up based a list of missed calls, each event item may be a caller-specific missed call. For example, as illustrated in (b) of FIG. 6A, if the touch input applied to the icon 610 on which the number of different callers 618 of the missed calls is displayed is dragged beyond a preset range, the popup window 630 on which the list of missed call is displayed.

The popup window 630 is displayed such that items 631, 632, and 633 of the number corresponding to the number of different callers displayed on the icon 610 is distinguishable from one another. For example, a caller name stored in the address book of the terminal, the number of missed calls, a time of receiving the missed call (e.g., a time of receiving the last missed call for each caller), and the like are displayed on the items, respectively.

The user can thus check the received missed call for each caller through the popup window 630. As will be described below in greater detail with reference to FIGS. 6C and 6D, the user can select whether to execute the application or whether to execute a specific function related to the application through the popup window 630. Further, when a short-touch input is applied to the second graphic object, the controller 180 can execute the application corresponding to the icon on which the second graphic object is displayed, and display the screen corresponding to the execution on the display unit 151.

The controller 180 can perform different controls are performed on the popup window according to the extent to which the drag touch input applied to the second graphic object is dragged. Specifically, when the dragging operation leaves a criterion range (e.g., a horizontal/vertical length of an icon), the controller 180 can display a popup window. When a touch up event occurs while the dragged extent does not leave the criterion range, for example, the popup window 630" can be rolled up like paper and disappear from the display unit 151 as shown in (a) and (b) of FIG. 6B.

The controller 180 can fix the popup window to a position in which the dragging operation leaves the criterion range and is released. For example, as shown in (c) of FIG. 6B, when the dragging is touched up at one position in the display unit 151, the popup window 630 does not disappear and is fixed to the corresponding position like a sticker. In this instance, if an "X" shape is displayed on one area of the popup window 630, for example, the right side of the upper end, the popup window 630 disappears.

Figure 6C:
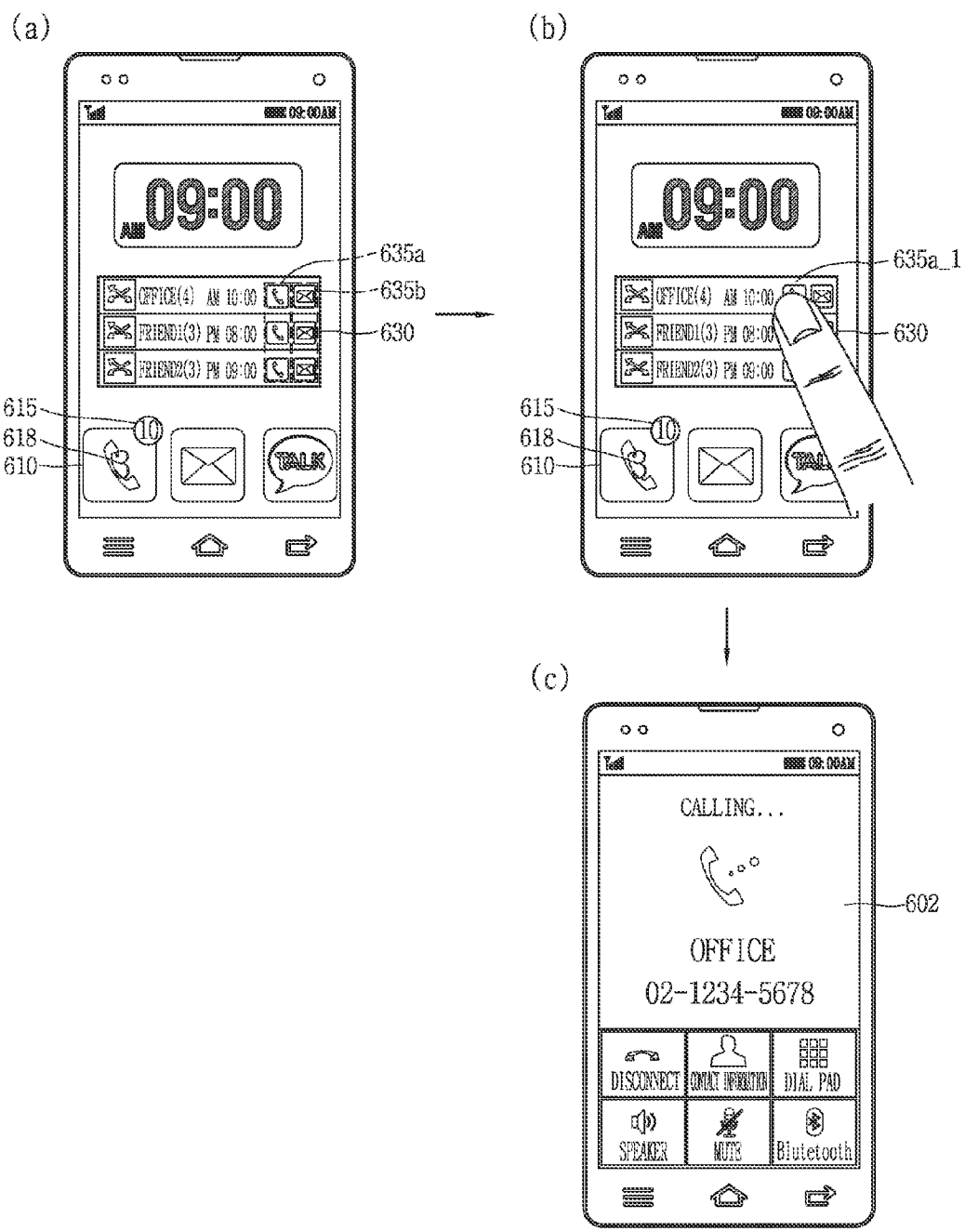

Execution icons 635a and 635b of at least one application corresponding to each event item associated with the additional information of the event may also be displayed on the popup window 630 as shown in (a) of FIG. 6C. In this instance, the controller 180 can execute the application corresponding to the selected execution icon in association with the relevant event item in response to selection of the execution icon for any one of event items.

For example, a specific execution icon 635a_1 displayed on the popup window 630 may be selected as shown in (b) of FIG. 6C, and the dialing to a specific caller of the missed calls, that is, "OFFICE" is directly performed. In other words, as shown in (c) of FIG. 6C, the home screen page that has been displayed on the display unit 151 is immediately switched to a calling screen 602.

When the touch input is sensed with respect to an area other than the area in which the execution icons 635a and 635b are displayed in the popup window 630, the controller 180 stops displaying the popup window on the display unit 151, and the corresponding application is executed in association with the popup window. Here, execution of the application in association with the popup window means that the screen associated with the information displayed on the popup window is first displayed upon executing the application.

For example, with reference to (a) and (b) of FIG. 6D, when the touch gesture input is sensed with respect to one position of an area 632 that is distinguished from the area in which the execution icons 635a and 635b are displayed in the popup window 630, the controller 180 can display a missed call list page 603 associated with the popup window 630 on the display unit 151 as illustrated in (c) of FIG. 6D.

The notification icon (i.e., "first graphic object") notifying the occurrence of the event and the graphic object (i.e., "second graphic object") used to provide the additional information about the notification icon may be updated each time the event occurs, and can disappear when the user finishing checking the event.

Figure 7A:
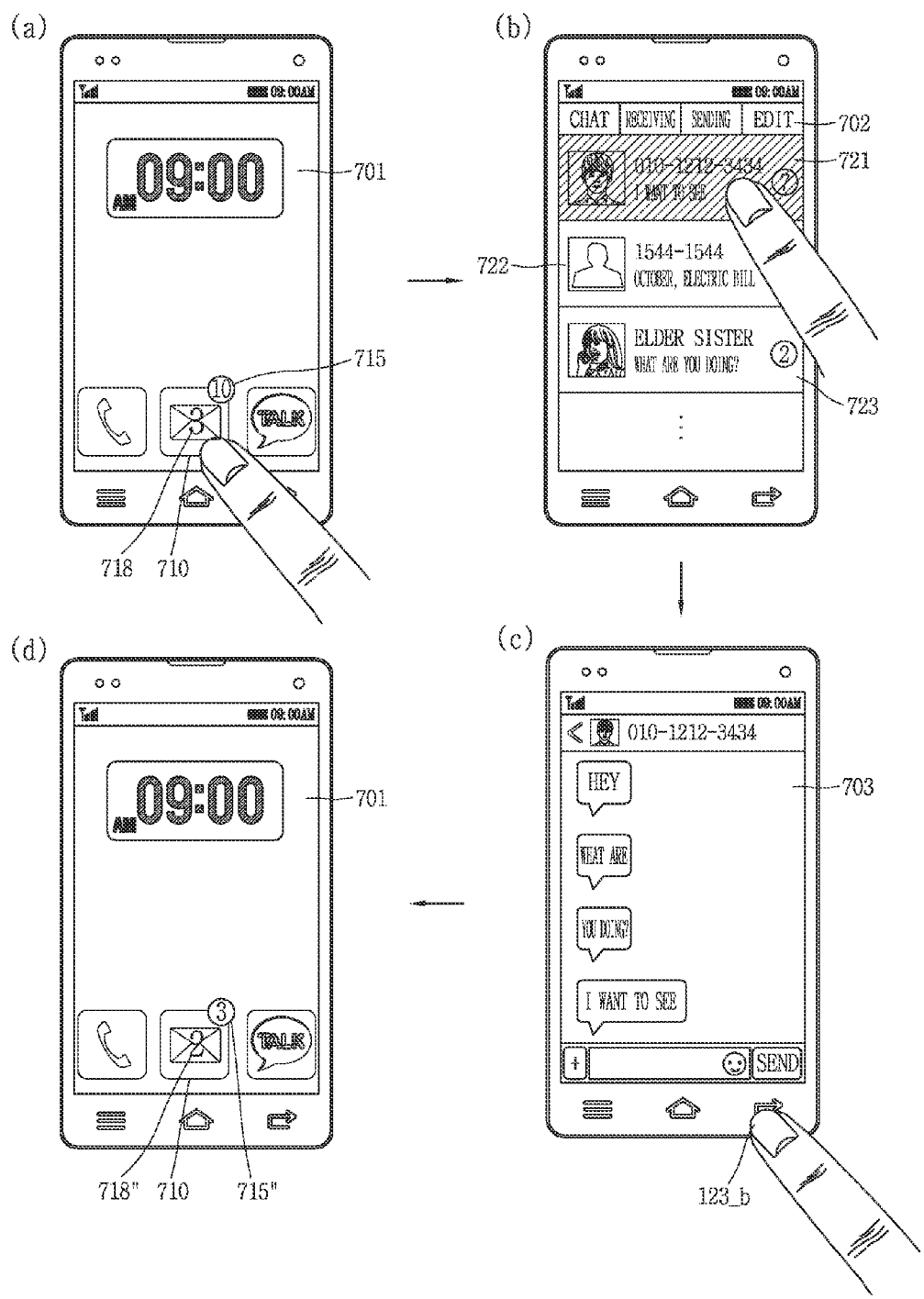
FIGS. 7A and 7B are overviews illustrating a process of a checked specific event in accordance with an embodiment of the present invention.
Figure 7B:
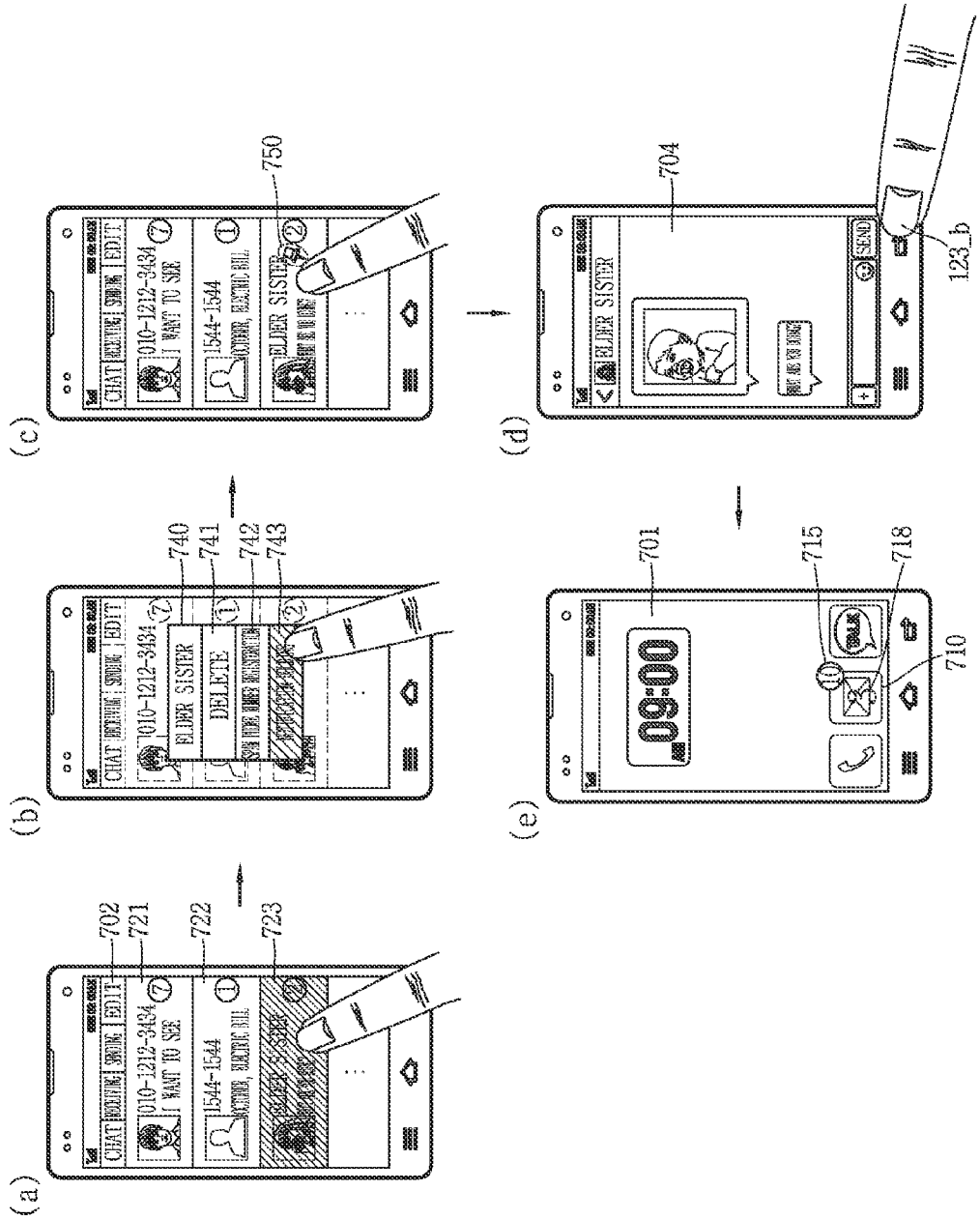

Next, a function for continuously displaying the notification icon and the graphic object may also be performed on the checked event. In this regard, FIGS. 7A and 7B are overviews illustrating a process for the checked event in accordance with an embodiment of the present invention. For example, as illustrated in (a) of FIG. 7A, the controller 180 can display a numerical value "10" 715 adjacent to an icon 710 displayed on a home screen page 701, and a numerical value "3" 718 on the icon 710 in response to sensing of an incoming event in which a total of 10 messages are received from three different senders.

As described above, while the notification icon and additional information of the event are displayed, and when the touch input is sensed with respect to the icon, the controller 180 can display a first screen indicating that the application corresponding to the icon to which the touch input is sensed is executed in association with the first and second graphic objects on the display unit 151. For example, as shown in (b) of FIG. 7A, the home screen page 701 is switched to a list screen 702 having 10 incoming messages displayed thereon.

In this instance, message incoming items 721, 722, and 723 for respective message senders are displayed on the list screen 702 such that they are distinguishable from one another.

When the user selects a message incoming item 721 corresponding to a specific sender in the list screen 702, the controller 180 can display a message window screen 703 corresponding to the relevant item 721 as shown in (c) of FIG. 7A and thus the user can check content of the incoming message.

In this instance, when the sensed event has been checked in the first screen, the controller 180 can stop displaying the first and second graphic objects corresponding to the icon or update them in the second screen (e.g., home screen page) on which the icon is displayed. For example, after the user checks the incoming message in (c) of FIG. 7A, when a back function key 123_b is selected, the home screen page 701 is displayed again as shown in (d) of FIG. 7A. Further, the notification icon and the additional information that have been displayed are updated. In other words, the information about the number of checked messages and the sender information are deleted, and a notification icon 715" and a graphic object 718" notifying that there are three incoming messages from two different senders are displayed.

Further, the function of continuously displaying the notification icon and the graphic object even after the sensed event has been checked can be performed. For example, according to the embodiment of the present invention, when the notification icon notifying the occurrence of the event and the graphic object notifying the additional information associated with the event are displayed on the icon of the application, if the touch input is sensed with respect to the popup window by performing a short-touching or touching and dragging on the relevant icon, the controller 180 can display the first screen on which at least one event item corresponding to the sensed event, for example, the incoming message list 702 as shown in (a) of FIG. 7B. The user can check that the total 10 incoming messages are received from three different senders through the message list 702.

When a preset touch input, for example, a long-touch input is applied to the specific message incoming item 723 in the message list 702 including items 721, 722 and 723, as illustrated in (a) of FIG. 7B, the controller 180 can display a menu window 740 including items 741-743 for setting a specific function to the message incoming item 723 on the display unit 151 as illustrated in (b) of FIG. 7B. The menu window 740 includes an item "NOTIFICATION HOLDING" 743. This item can be activated when there is at least one unchecked event in the selected specific message incoming item 723.

When the item "NOTIFICATION HOLDING" 743 is selected in the menu window 740, an image 750 indicating that the notification holding function has been applied, for example, a fixing pin-shaped image is displayed on the corresponding item 723 as shown in (c) of FIG. 7B. As described above, the controller 180 can perform control such that the displays of the first and second graphic objects are held in the second screen on which the icon is displayed, or change the display of the first and second graphic objects in response to the sensing of the input of holding an event notification related to at least one event item in the first screen on which the at least one event corresponding to the event has been displayed. Thus, even when an operation of checking the incoming message on the item 723 to which the notification holding function is applied as shown in (d) of FIG. 7B, the displays of the notification icon 715 and the graphic object 718 that have previously been output is held as shown in (e) of FIG. 7B.

Further, the change of the display of the first and second graphic objects based on the input corresponds to the addition of only the display related to the check of the event rather than the change of the information associated with the event. In other words, the information associated with the event may be held and the controller 180 can display an image notifying the user has checked in advance, for example, an image in which the first and second graphic objects are displayed differently from the previous color or to be duller than the previous status.

When a display icon 750 notifying the notification holding function has been applied and is displayed as shown in (c) of FIG. 7B, the controller 180 can execute the application corresponding to the icon to which the touch input is sensed in association with the event item having the display output thereto.

In other words, when the message application is executed, a chat window corresponding to the event item 723 having the notification holding display 750 displayed thereon is displayed on the display unit 151. For example, when the touch input is applied to the icon in (c) of FIG. 7B, the screen is immediately switched to a chat window screen 704 illustrated in (d) of FIG. 7B.

Further, when the screen is switched to the home screen page having the corresponding icon output thereto after the notification holding function is executed through a specific event item, the controller 180 can display an image indicating that the check for the event has been performed. In addition, whether such a function associated with the notification holding is executed may be determined through the popup window displayed in response to the application of the drag touch input to the second graphic object. In other words, an input area for displaying the check of the event has been performed on at least one event item may be further displayed on the popup window described above.

Such an input area may be expressed, for example, in the popup window or in the form of a "check box" for each event item of the popup window. Depending on a type of a touch input applied to the "check box," the controller 180 can recognize the relevant event has been checked or the notification holding function has been applied to the relevant event. When the input indicating the relevant event has been checked is applied to the input area, the controller 180 can change the display of the first and second graphic objects based on the input. As described above, according to an embodiment of the present invention, by holding the event notification of the checked specific event, subsequently the event information corresponding to the specific event may be quickly rechecked.

Further, the notification and the graphic object can be displayed on the status display area having the information associated with the current status of a mobile terminal displayed thereon. When a back key 123_b is selected as shown in (d) of FIG. 7B, the home screen page 701 is displayed again as shown in (e) of FIG. 7B.

Figure 8A:
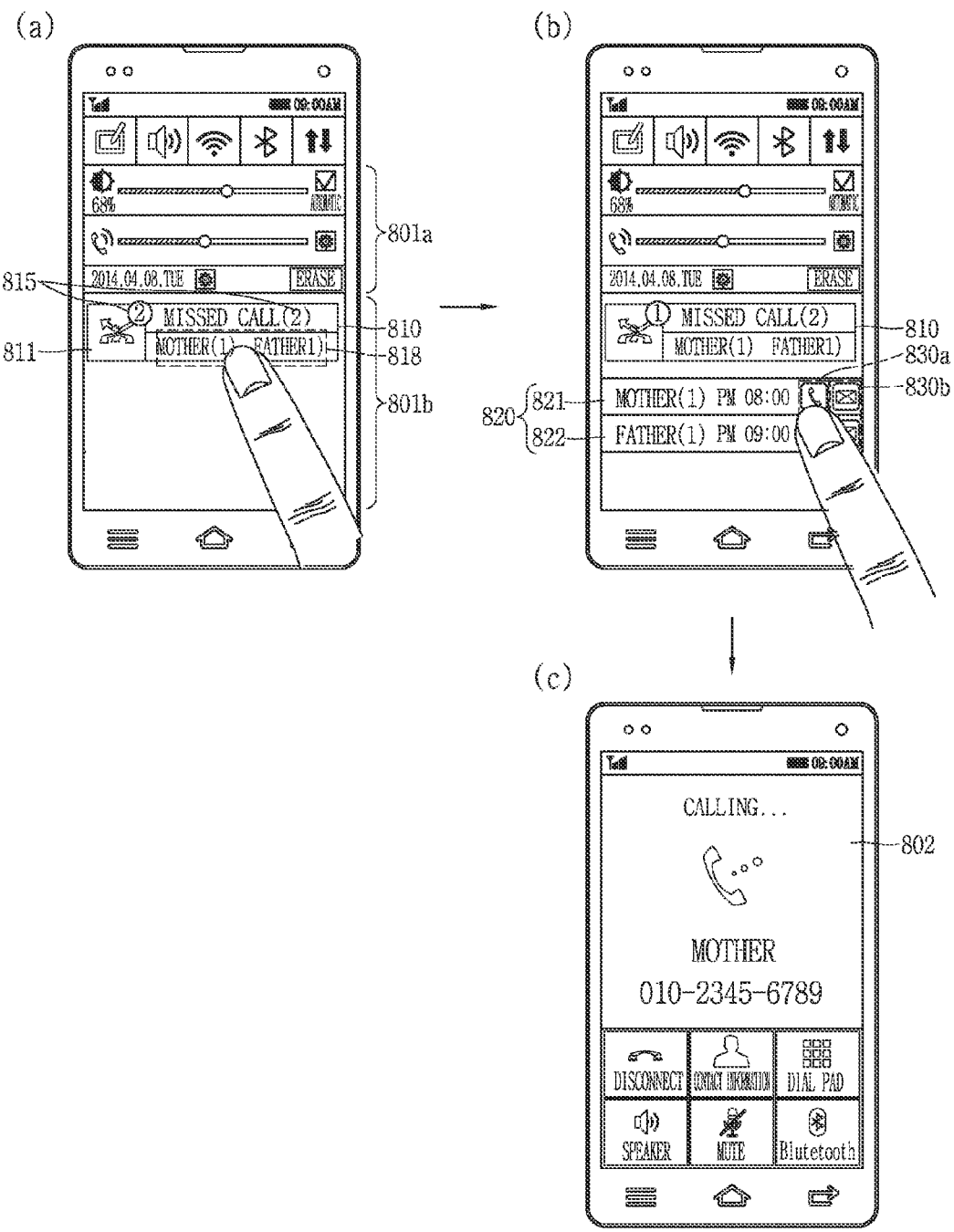
FIGS. 8A to 8C are overviews illustrating a method of selectively checking an event in accordance with an embodiment of the present invention.
Figure 8B:
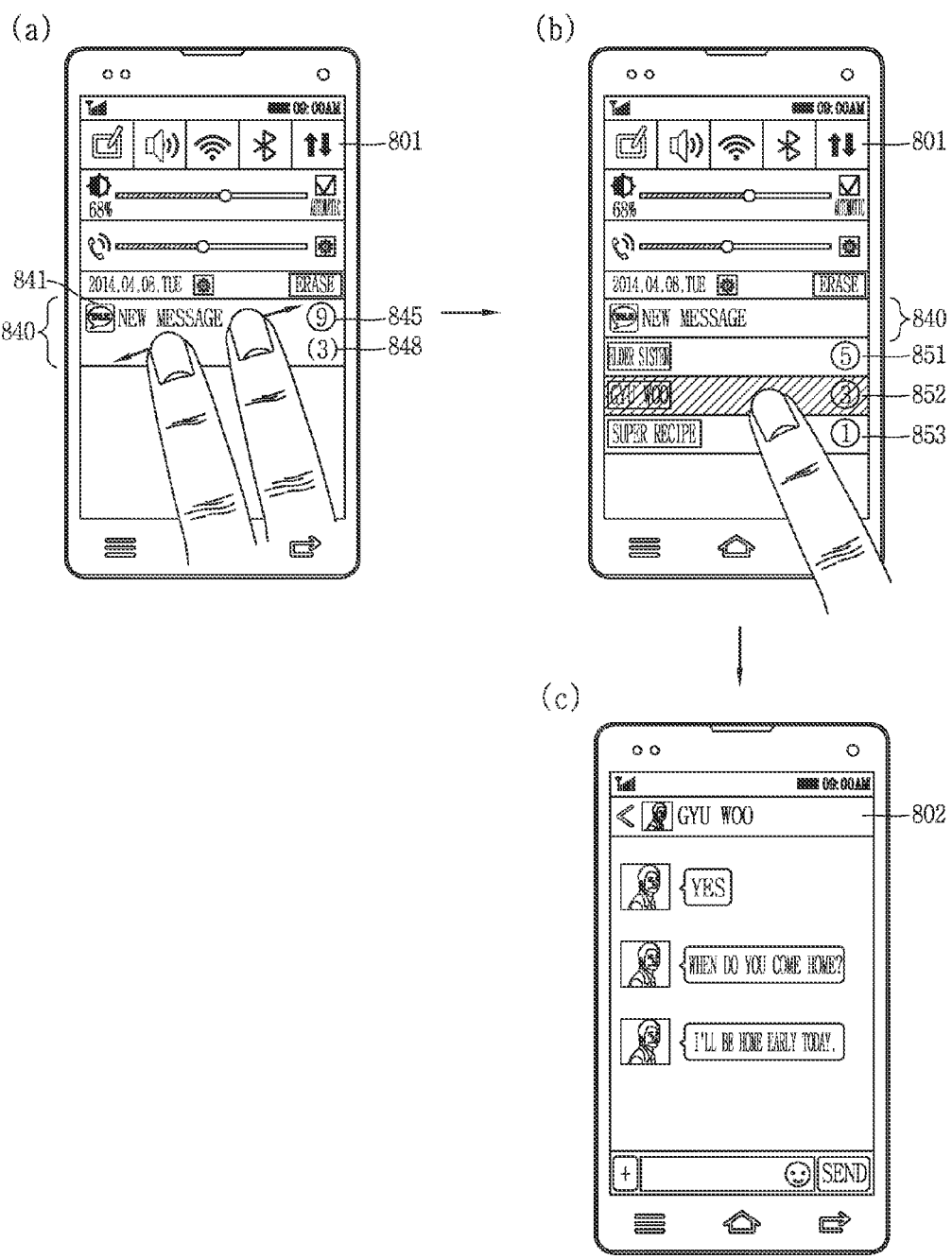
Figure 8C:
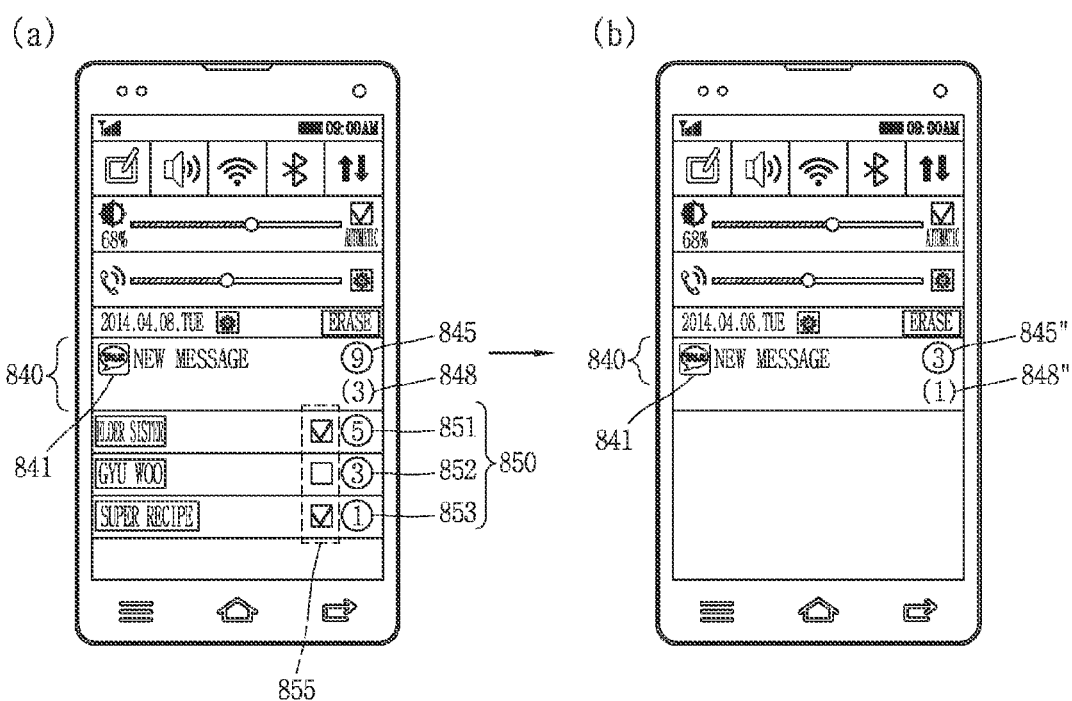

In more detail, FIGS. 8A to 8C are overviews illustrating a method of selectively checking an event in a status display area in accordance with an embodiment of the present invention. The controller 180 can sense that an event occurs from at least one application. The "application" may be represented by an "application program" or an "applied program," and refers to all type of programs that can be driven in a terminal Such an application may be, for example, a program associated with causing a web browser, moving image reproduction, schedule management, calling, a game, music, a document work, a message, monetary, an e-book, traffic information, and an application to be updated.

Meanwhile, an "event" occurring from the application corresponds to giving an influence on an operation of at least one application installed in a terminal body, changing an item of a database (or a database file) associated with the at least one application, or transferring or transmitting data with an external terminal or an external network through the at least one application occurs. For example, occurrence of the event may include when there is a missed call, when there is an application to be updated, when a message is received, for charging, when the terminal is powered on, when the terminal is powered off, when an LCD awake key is pressed, when the alarm rings, when the incoming call is performed, and the case of the missed notification. Further, specific information is received through the wireless communication unit 110, an event may occur from an application associated with the received specific information.

Next, the controller 180 can sense a touch gesture input to the display unit 151 on a status display area in which information associated with the current status of the mobile terminal is displayed. Here, the touch gesture input is, for example, a gesture input of dragging a touch input applied to an upper end area of the display unit 151 downward, and the status display area is shown according to a dragged direction. When the dragging continues to the end of the lower end area, the status display area is displayed on the entire display unit 151.

Also, the notification icon associated with the sensed event and the graphic object notifying the additional information are displayed on one area of the status display area. Here, the graphic object notifying the additional information may be implemented in a long bar shape in a horizontal direction, and such a bar-shaped graphic object may be displayed on the corresponding icon and the area adjacent to the notification icon.

For example, when two missed calls come from two different callers, as illustrated in (a) of FIG. 8A, a notification icon 815 (i.e., "first graphic object") notifying the number of received missed calls is displayed on a second area 801b distinguished from a first area 801a along with an icon 811 of a call application. Also, different sender information ("MOTHER," "FATHER"), that is, a graphic object 818 (i.e., "second graphic object") notifying sender names and the number of missed calls from each sender is further displayed. As illustrated in (a) of FIG. 8A, the icon 811, the notification icon 815, and the graphic object 818 may be displayed in the bar shape 810. In this instance, when an amount of information related to the different sender information 818 is large, the information can be displayed as a dynamic image that moves in a preset direction.

As described above, when a preset touch gesture input, long-touch input, drag touch input, or pinch-in/pinch-out touch input is sensed with respect to an area in which the first graphic object is displayed while the second graphic object is displayed, the controller 180 can display a plurality of event items associated with the additional information corresponding to the second graphic object. Further, the plurality of event items are visual information that indicate the additional information associated with the event displayed on the second graphic object in greater detail.

For example, missed calls may be displayed as a plurality of items 820 including items 821 and 822 distinguished from one another for each sender as shown in (b) of FIG. 8A.

Also, execution icons 830*a* and 830*b* for directly executing the corresponding application are further displayed on each item.

In this instance, the controller 180 can perform different operations according to a type of a touch gesture input applied to the bar. For example, when a short-touch input is sensed with respect to an area in which the first graphic object is displayed, a plurality of event items are not output, and the screen is switched to the missed call list screen. Further, when a touch input sliding in a lateral surface direction is sensed with respect to the area in which the first graphic object is displayed, the bar on which the first and second graphic objects are displayed disappears in a sliding direction.

Meanwhile, the sender corresponding to the item 821 can be directly called as shown in (c) of FIG. 8A in response to the selection of the execution icon 830*a* displayed on the item 821 in (b) of FIG. 8A. In other words, a process for the plurality of events that have occurred are not performed in several steps, but directly performed.

The controller 180 can output a plurality of event items for checking a plurality of events in the status display area in different manners. For example, the plurality of event items can be generated for each entity corresponding to a specific criterion. Here, an entity is an aggregate for storing and managing useful information and corresponds to the event items generated with respect to a message received from the same sender and an instant message received from the same chat group, respectively.

In this instance, when any one of the plurality of output event items is selected, the controller 180 can execute the corresponding application in association with the selected event item. For example, when a notification bar 840 according to an embodiment of the present invention is generated in a status display area in (a) of FIG. 8B, a corresponding icon 841, the number of unchecked received messages 845, and the number of different senders 848 who send messages are displayed.

When a pinch-out touch input or a touch input of dragging the screen downward from above is sensed with respect to an area to which the notification bar 840 is displayed as shown in (a) of FIG. 8B, the controller 180 can display incoming messages for each entities 851, 852, and 853 as shown in (b) of FIG. 8B. Also, when any one item 852 of the entity-specific distinguishing event items 851, 852 and 853 is selected, the screen is moved to a message window corresponding to the selected item as shown in (c) of FIG. 8B.

Further, when a preset touch input is applied to the notification bar 840, a predetermined input area for displaying the fact that each event has been checked may be displayed on each of the entity-specific distinguishing event items. For example, as shown in (a) of FIG. 8C, "check boxes" 855 corresponding to an input area for displaying the event are respectively displayed on the plurality of event items 851, 852, and 853 opened due to the application of a preset touch gesture input to the notification bar 840.

Thus, the user can use the "check box" to display the unchecked message to be checked even without directly checking the content of the event by executing the application corresponding to the relevant event item. As described above, when a check mark is entered, the display of the corresponding notification icon and additional information disappears on the screen. This is particularly useful when the message includes content already known through a spam message or a popup message.

In this way, when check marks are entered in the selected items 851 and 853 of the plurality of event items 851, 852, and 853, the notification icon and the graphic object notifying the additional information about the event that have been displayed on the notification bar can be changed as shown in (b) of FIG. 8C. In other words, the controller 180 recognizes that five unchecked messages from the "ELDER SISTER" and one unchecked message from "SUPER RECIPE" have been checked. Also, only a notification icon 845" for three messages from "GYU WOO" and an additional information 848", which are the remaining items, are displayed on the notification bar 840. The corresponding event item 852 is hidden.

Next, FIG. 9 includes overviews showing a method of displaying additional information of an event when the event is sensed in a folder including a plurality of applications in accordance with an embodiment of the present invention. As described above, when the event is sensed, the notification icon (i.e., "first graphic object") notifying the sensing of the event and the additional information (i.e., "second graphic object") associated with the event displayed based on the display of the notification icon are output along with the icon of the corresponding application.

In this instance, the icon of the application, the corresponding notification icon, and the additional information may be displayed on the home screen page on which the icon of the application is always output, and on one area (e.g., the left side area of the lower end) of the screen (e.g., a web page) that is currently being output. In this instance, the restriction may be performed so that only the icon of the application corresponding to the last event, the corresponding notification icon, and the additional information are displayed.

In addition, when the home screen page includes a plurality of pages, and the notification icons respectively corresponding to the icons of the plurality of applications displayed on different pages, and the additional information are displayed, as the user applies the preset touch input (e.g., which is selected using the menu window that is popped up due to the long-touch input) so that he or she can check the notification icon and the icons on which the additional information are displayed at a time, the notification icons and the icons may be collectively displayed on one page.

One representative icon, for example, a folder icon in which a plurality of icons are collected may be displayed on the home screen page. In this instance, when the event is sensed in the application corresponding to any one icon among the plurality of icons corresponding to the folder icon, a method of displaying the additional information of the event is as follows. According to an embodiment, when the icon displayed on the display unit 151 is the folder image including the plurality of icons corresponding to the plurality of applications, the controller 180 can display the additional information associated with the event, that is, the second graphic object on an icon image corresponding to the application in which the event displayed in the relevant folder image is sensed.

For example, as illustrated in (a) of FIG. 9, at least some icons 921, 922, 923, and 924 corresponding to applications that are included in a folder is a folder icon 910 displayed on a home screen page 901. Information 915 (e.g., "1") ("first graphic object") about the number of all events occurring from the applications is displayed adjacent to the folder icon 910, and a notification icon 918 ("second graphic object") is displayed on the icon 921 of the application for the event that occurs in the folder icon 910 so that the application for the event that occurs can be identified.

According to another embodiment, the controller 180 can change the first graphic object displayed adjacent to the folder icon to a representative image associated with the application in which the event is sensed. For example, the first graphic object 915 displayed on the right side area of the upper end of the folder icon 910 in (a) of FIG. 9 is replaced with the icon image of the application for the event that occurs and an image 915_B on which information about the number of events that have occurred is displayed as shown in (b") of FIG. 9. In this instance, when the preset touch gesture input (e.g., short-touch input) is sensed with respect to the displayed image 915_B, the application corresponding to the selected image 915_B (e.g., "F") is executed, and the event information corresponding to the event that has occurred is displayed on the display unit 151 as shown in (c) of FIG. 9.

According to still another embodiment, the controller 180 can differently change an arrangement type of the plurality of icons displayed in the folder image so that the icon corresponding to the application in which the event is sensed in the folder icon is displayed in the folder icon. For example, a notification icon 915_A notifying the total three events occur from the applications included in the folder icon 910 is displayed in (b) of FIG. 9. In this instance, only the information about the number of the events that have occurred is displayed on the icon (e.g., "A") of the application in which two events that have been originally displayed in the folder icon 910 occur.

Further, while the icon (e.g., "F") of the application that another one event occurs is not originally displayed in the folder icon 910, other icons (e.g., "B, C, and D") displayed in the folder icon 910 can be arranged so that the icon (e.g., "F") of the application for the event that occurs is displayed. In this instance, when the sensed event has been checked, the changed arrangement of the icons is returned to the previous arrangement. In addition, another image notifying the occurrence of the event, for example, an image having different sizes, colors, or shapes of the relevant icon can be displayed on the icon corresponding to the application for the event that occurs in the folder icon, or a highlighting effect can be displayed on the relevant icon.

Figure 10A:
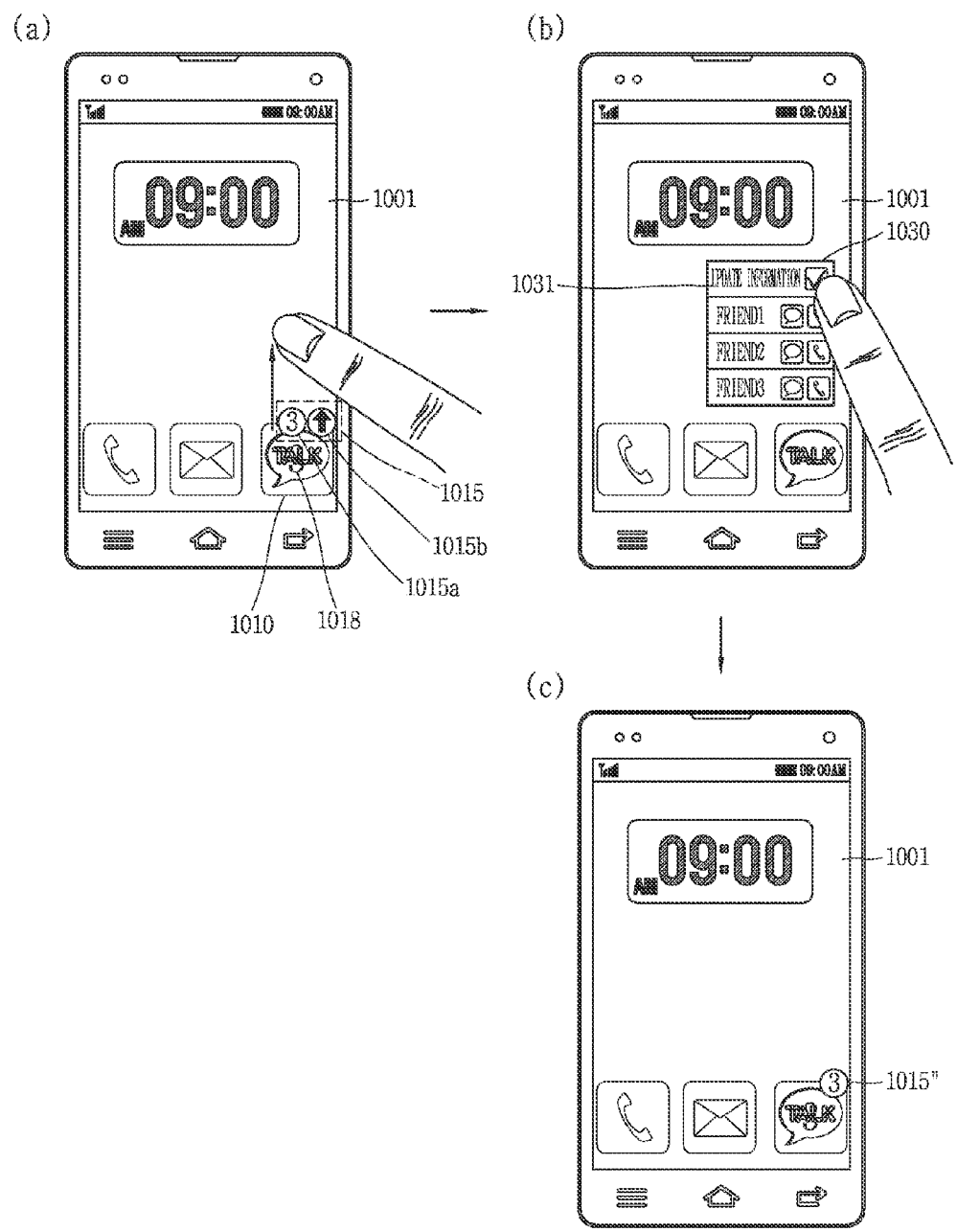

Next, FIGS. 10A to 10D are views showing various embodiments in which additional information of events are differently displayed depending on a type of a sensed application in relation to various embodiments that have been described above in accordance with an embodiment of the present. In particular, FIG. 10A shows an embodiment in which additional information of events are displayed when the plurality of different types of events occur from a message application.

In more detail, when three unchecked messages are received from three different senders, and one update event occurs in the message application, information 1018 of three different senders are displayed on an icon 1010, and a first notification icon 1015a and a second notification icon 1015b distinguished according to the types of the events that have occurred are displayed on an area adjacent to the icon 1010 as shown in (a) of FIG. 10A. For example, the first notification icon 1015a notifies of the occurrence of a message incoming event, and the second notification icon 1015b notifies of the occurrence of an update event.

When a dragging operation is performed such that the touch input applied to the icon 1010 leaves a criterion range, a popup window 1030 including information associated with the event that has occurred is displayed as shown in (b) of FIG. 10A. When a check mark ("V") is entered by the user for an update event item 1031 through the popup window 1030, the controller 180 can recognize that the update event has been checked, and stop displaying the second notification icon 1015b without the need to execute the application as shown in (c) of FIG. 10A.

In addition, FIG. 10B shows an embodiment in which additional information of an event is displayed when the event in which status information associated with a game execution in a game application is changed occurs. When the event occurring from the gram application is, for example, when the status information associated with the game execution is gradually changed according to a flow of time, a dynamic animation effect, for example, a gradual change of a color can be displayed on the icon so that such a gradual change is reflected to the corresponding icon.

For example, in the status information in which the game cannot directly be executed, the entire icon can be displayed in a monochrome fashion 1021 as shown in (a) of FIG. 10B, and then at least a part of the icon can be displayed in a color fashion 1022 according to the flow of time as shown in (b) of FIG. 10B. When the status information is completely changed, the entire icon can be displayed in a color fashion and a highlighting effect (e.g., displaying an edge as a thick line, and a flicker effect) 1023 can be displayed on the relevant icon as shown in (c) of FIG. 10B.

Next, FIG. 10C shows an embodiment in which additional information of an event is displayed when the event in which a position of a terminal is changed in a weather application occurs. In order to provide weather information about a current position of the terminal of the weather application, the positional information of the terminal may be received using, for example, a global positioning system (GPS).

In this instance, the received positional information of the terminal can be changed from a first notification icon 1045 (e.g., "GANG NAM") to a second notification icon 1045" (e.g., "SU SEO") and displayed on an area adjacent to an icon 1040 as shown in (a) and (b) of FIG. 10C. Also, an image corresponding to weather information of a relevant region may be changed and displayed on the icon 1040 according to the change of the positional information. In other words, a "sunny image" 1048 can be displayed as additional information about the first notification icon 1045 (e.g., "GANG NAM"), and then changed to a "heavy rain image" 1048" as additional information about the second notification icon 1045" (e.g., "SU SEO"). In addition, when a short-touch and drag input is applied to the icon 1040, a popup window 1050 including detailed information such as weekly weather information about the relevant region (e.g., "SU SEO") is displayed as shown in (c) of FIG. 10C.

As described above, the mobile terminal and the control method for the mobile terminal according to the embodiments of the present invention can visually and directly check the additional information about the unchecked event in the current screen even without performing the application for the event that occurs. Also, the event information corresponding to the specific event can be subsequently rechecked by continuously holding the event notification about the specific event among the checked events. When the application that the plurality of events occur is executed, user-customized information can be provided by outputting the event information corresponding to the event that the user first wants to check rather than the screen related to the event that has recently occurred.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal comprising:
a wireless communication unit configured to perform wireless communication;
a display unit configured to display a home screen and an icon corresponding to an application on the home screen; and
a controller configured to:
display a first graphic object on the home screen along with the icon indicating first information about an event that has occurred with respect to the application,
display a second graphic object on the icon including second information about the event that has occurred in which the second information includes more detailed information than the first information,
receive a dragging touch input applied to the second graphic object,
display a popup window for the second graphic object on the home screen without executing the application corresponding to the second graphic object, the popup window including at least one event item comprising additional information associated with the second information, and
perform different control commands on the popup window according to an extent to which the dragging touch input applied the second graphic object is dragged,
wherein the popup window disappears from the home screen when a touch up event occurs while the dragged extent does not leave a preset range, and
wherein the popup window is fixed to a position in which the dragging is released when the touch up event occurs while the dragged extent leaves the preset range.

2. The mobile terminal of claim 1, wherein the controller is further configured to display the second graphic object on at least one of the icon and the first graphic object, and to change the second graphic object when the first graphic object is changed.

3. The mobile terminal of claim 2, wherein the first information of the first graphic object notifies a non-response to a call incoming event, and the second information of the second graphic object notifies caller information corresponding to the non-response call incoming event.

4. The mobile terminal of claim 1, wherein the controller is further configured to display additional second information at a preset time interval.

5. The mobile terminal of claim 4, wherein the second information is displayed as a dynamic image on the icon in a preset direction.

6. The mobile terminal of claim 5, wherein the controller is further configured to:
receive a preset touch gesture input with respect to the icon while the second information is displayed on at least one of the icon and the first graphic object, and
execute the application corresponding to the icon.

7. The mobile terminal of claim 1, wherein, when the second information includes multiple pieces of additional information corresponding to the event, the controller is further configured to display a plurality of second graphic objects corresponding to the multiple pieces of additional information on a plurality of areas adjacent to the icon or a plurality of distinguishable areas in the icon.

8. The mobile terminal of claim 1, wherein the controller is further configured to:
display an execution icon of at least one application corresponding to each event item included in the popup window,
receive a selection of the execution icon, and
execute an application corresponding to the selected execution icon.

9. The mobile terminal of claim 8, wherein the controller is further configured to:
receive a touch input to an area of the popup window other than an area in which the execution icon is displayed, and
stop displaying the popup window on the display unit and execute an application corresponding to the popup window.

10. The mobile terminal of claim 1, wherein the controller is further configured to:
receive a touch input on the icon,
display a first screen including a breakdown of information corresponding to the first and second graphic objects,
receive a first type of touch input for selecting an item included in the breakdown of information, and display an execution screen for an application corresponding to the selected item included in the breakdown of information based on the received first type of touch input, and
receive a second type of touch input of an item included in the breakdown of information, and display a menu including a pinning operation for not updating the first and second information indicated by the first and second graphic objects, respectively, based on the selected item and executed application.

11. The mobile terminal of claim 10, wherein the controller is further configured to:
update the first information indicated by the first graphic object and update the second information indicated by the second graphic object based on the selected item and executed application, and
redisplay the first and second graphic objects.

12. The mobile terminal of claim 1, wherein the controller is further configured to:
display the first graphic object on a status display area including status information associated with a current status of the mobile terminal,
display the second graphic object on the first graphic object, and
display a plurality of event items associated with the first and second information.

13. The mobile terminal of claim 1, wherein the icon is displayed as a folder image including a plurality of icons corresponding to a plurality of applications, and
wherein the first graphic object is displayed adjacent to the folder image and the second graphic object is displayed on a corresponding icon image for the event.

14. The mobile terminal of claim 13, wherein the controller is further configured to change an arrangement of the plurality of icons included in the folder image based on a corresponding event that has occurred for a corresponding application.

15. A method of controlling a mobile terminal, the method comprising:
displaying, via a display unit of the mobile terminal, a home screen and an icon corresponding to an application on the home screen;

displaying a first graphic object on the home screen along with the icon indicating first information about an event that has occurred with respect to the application;

displaying a second graphic object on the icon including second information about the event that has occurred in which the second information includes more detailed information than the first information;

receiving a dragging touch input applied to the second graphic object;

displaying a popup window for the second graphic object on the home screen without executing the application corresponding the second graphic object, the popup window including at least one event item comprising additional information associated with the second information; and performing different control commands on the popup window according to an extent to which the dragging touch input applied the second graphic object is dragged, wherein the popup window disappears from the home screen when a touch up event occurs while the dragged extent does not leave a preset range, and wherein the popup window is fixed to a position in which the dragging is released when the touch up event occurs while the dragged extent leaves a preset range.

16. The method of claim 15, further comprising:

displaying the second graphic object on at least one of the icon and the first graphic object; and changing the second graphic object when the first graphic object is changed.

17. The method of claim 16, wherein the first information of the first graphic object notifies a non-response to a call incoming event, and the second information of the second graphic object notifies caller information corresponding to the non-response call incoming event.

18. The method of claim 15, further comprising:

displaying additional second information at a preset time interval.

* * * * *